(12) United States Patent
Larsson et al.

(10) Patent No.: US 8,612,192 B2
(45) Date of Patent: Dec. 17, 2013

(54) VEHICLE SIMULATION SYSTEM WITH SOFTWARE-IN-THE-LOOP BYPASS CONTROL

(75) Inventors: Johan Larsson, Trollhättan (SE); Tobias Berndtson, Grästorp (SE); Kenneth K. Lang, Saline, MI (US); Xuefeng Tim Tao, Northville, MI (US); Colin Hultengren, New Hudson, MI (US); Michael A. Kropinski, Troy, MI (US); Manmeet Mavi, Chandigarh, IN (US); Sriram Venkataramanan, Chennai, IN (US); David W. Wright, Howell, MI (US)

(73) Assignee: GM Global Technology Operations LLC

( * ) Notice: Subject to any disclaimer, the term of this patent is extended or adjusted under 35 U.S.C. 154(b) by 340 days.

(21) Appl. No.: 12/861,207

(22) Filed: Aug. 23, 2010

(65) Prior Publication Data

US 2011/0288841 A1 Nov. 24, 2011

Related U.S. Application Data

(66) Substitute for application No. 61/347,641, filed on May 24, 2010.

(51) Int. Cl.
G06G 7/48 (2006.01)
(52) U.S. Cl.
USPC ........ 703/8; 703/13; 701/2; 701/36; 701/301; 701/23; 702/183
(58) Field of Classification Search
USPC .................... 703/8, 13, 7; 700/37, 90, 29, 11
See application file for complete search history.

(56) References Cited

U.S. PATENT DOCUMENTS

| | | | |
|---|---|---|---|
| 7,067,740 B1 | 6/2006 | Belov et al. | |
| 7,644,398 B2 | 1/2010 | Cleaveland et al. | |
| 2003/0182027 A1 | 9/2003 | Mocek | 701/1 |
| 2005/0275284 A1* | 12/2005 | Katayama | 303/146 |
| 2006/0277010 A1* | 12/2006 | Schutte et al. | 703/8 |
| 2007/0038422 A1* | 2/2007 | Wang et al. | 703/8 |

(Continued)

FOREIGN PATENT DOCUMENTS

CN 101308365 11/2008

OTHER PUBLICATIONS

Alexander Eichberger Generating Multibody Real-Time Models for Hardware-in-the-Loop Applications 2003.*

(Continued)

*Primary Examiner* — Omar Fernandez Rivas
*Assistant Examiner* — Cuong Luu

(57) ABSTRACT

A vehicle simulation system includes a first simulation model that when executed simulates a software ring along with other software of a vehicle module. The vehicle simulation system further includes a second simulation model of the software ring. A bypass switch that has a first state and a second state. A bypass switching module switches the bypass switch between the first simulation model and the second simulation model based on a bypass signal and a ring enabling signal. A simulation control module executes code of a vehicle simulation model including software in-the-loop (SIL) testing of a selected one of the first simulation model and the second simulation model based on state of the bypass switch.

19 Claims, 25 Drawing Sheets

(56) References Cited

U.S. PATENT DOCUMENTS

| | | | |
|---|---|---|---|
| 2007/0088469 A1* | 4/2007 | Schmiedel et al. | 701/23 |
| 2008/0004840 A1* | 1/2008 | Pattipatti et al. | 702/183 |
| 2008/0133206 A1* | 6/2008 | Devins et al. | 703/15 |
| 2008/0215304 A1* | 9/2008 | Bailey et al. | 703/14 |
| 2009/0157236 A1 | 6/2009 | Van Gaasbeck et al. | 701/3 |
| 2009/0306866 A1* | 12/2009 | Malikopoulos | 701/59 |
| 2009/0306952 A1* | 12/2009 | Kajitani et al. | 703/13 |
| 2010/0082303 A1 | 4/2010 | Rousseau et al. | |
| 2011/0066416 A1* | 3/2011 | Sachs | 703/13 |
| 2011/0153536 A1* | 6/2011 | Yang et al. | 706/47 |
| 2012/0022847 A1* | 1/2012 | Bailey et al. | 703/14 |

OTHER PUBLICATIONS

David Wenzhong Gao, Chris Mi, Ali Emadi Modeling and Simulation of Electric and Hybrid Vehicles Proceedings of the IEEE, vol. 95, No. 4, Apr. 2007.*

U.S. Appl. No. 12/555,338, filed Sep. 8, 2009, Esfahan et al.

U.S. Appl. No. 12/861,176, filed Aug. 23, 2010, Kropinski et al.

Kurt J. Mitts, Keith Lang, Thierry Roudier, and Daniel L. Kiskis; SAE Technical Paper Series 2009-01-0520; "Using a Co-simulation Framework to Enable Software-in-the-Loop Powertrain System Development"; Copyright 2009 SAE International; 6 pages.

dSPACE Catalog 2008, pp. 1-505.

* cited by examiner

FIG. 23

VEHICLE SIMULATION SYSTEM WITH SOFTWARE-IN-THE-LOOP BYPASS CONTROL

CROSS-REFERENCE TO RELATED APPLICATIONS

This application claims the benefit of U.S. Provisional Application No. 61/347,641, filed on May 24, 2010. The disclosure of the above application is incorporated herein by reference in its entirety.

This application is related to U.S. patent application Ser. No. 12/861,176 filed on Aug. 23, 2010. The disclosure of the above application is incorporated herein by reference in its entirety.

FIELD

The present disclosure relates to vehicle hardware and software simulation systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle controllers and hardware may be tested in a simulated environment before production to ensure component and system fidelity. The simulated environment is provided by a vehicle simulation system. Vehicle simulation systems exist for hardware in-the-loop (HIL) testing. HIL testing includes using embedded software that is executed on a target control module, which interfaces with physical and simulated loads.

Although HIL testing can be effective, HIL testing requires developing physical loads or real time simulated loads, which can be expensive and only available late in a development cycle. HIL testing also includes using a set of hardware devices, such as a vehicle control module (e.g., transmission control module) and a signal simulator.

SUMMARY

A vehicle simulation system is provided and includes a first simulation model that when executed simulates a software ring of a vehicle module. The vehicle simulation system further includes a second simulation model of the software ring. A bypass switch that has a first state and a second state. A bypass switching module switches the bypass switch between the first simulation model and the second simulation model based on a bypass signal and a ring enabling signal. A simulation control module executes code of a vehicle simulation model including software in-the-loop (SIL) testing of a selected one of the first simulation model and the second simulation model based on state of the bypass switch.

In other features, a vehicle simulation system is provided and includes simulation models; each of the simulation models has respective inputs and outputs. An object selection module selects N objects of the simulation models based on user input signals. N objects include variables, signals, and nodes and N is an integer greater than or equal to 2. A signal tracking module tracks states of the N objects during execution of code of a vehicle simulation model. A data recording module records the states of the N objects. A plotting module plots states of M of the N nodes on a graphical user interface, where M is an integer less than or equal to N.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 23 is a view of multiple debugger windows in accordance with the present disclosure;

DETAILED DESCRIPTION

Figure 1:
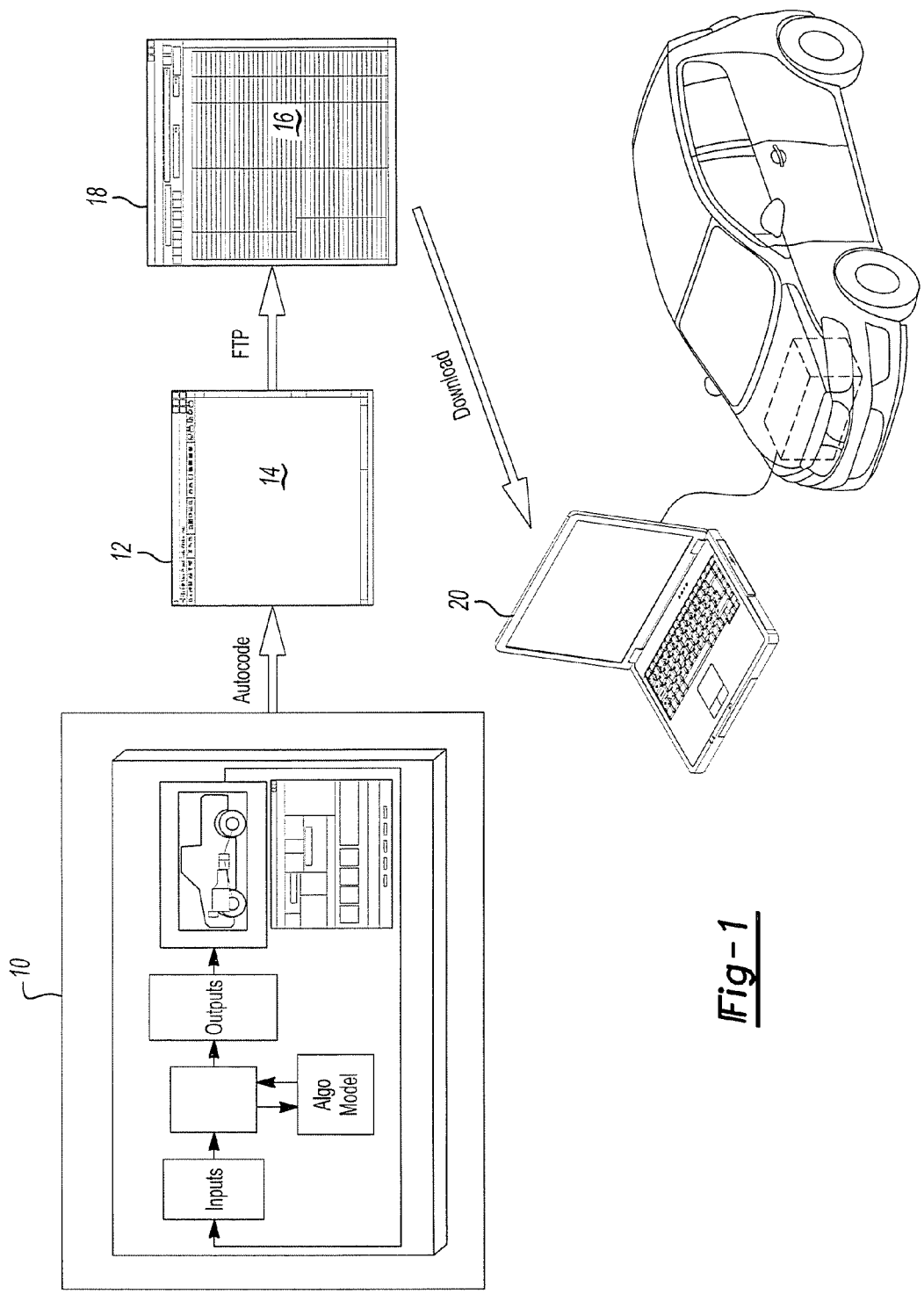
FIG. 1 is a vehicle development process diagram incorporating a vehicle simulation model in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer refers to, is part of, or include includes an Application Specific Integrated Circuit (ASIC), an electronic circuit, a processor (shared, dedicated, or group) and/or memory (shared, dedicated, or group) that execute one or more software or firmware programs, and/or a combinational logic circuit.

A first alternative to hardware in-the-loop (HIL) testing includes the simulation of a vehicle control module using source code (e.g., C code, Fortran, etc.) and/or hand code and simulation of a plant model. Hand code may refer to the manipulation of source code manually and can include errors. This approach is not expandable as the code associated with the vehicle control module is fixed. Changes to the source code and execution of additional simulations are tedious using this approach.

Another alternative to HIL testing (referred to as 2-mode hybrid bus testing) includes simulating a vehicle control module and vehicle components or systems using model-based software. The model-based simulation software (e.g., Matlab™ and Simulink™ software by Mathworks™) is window based and involves the connecting of function blocks and corresponding inputs and outputs to create a model. Models are developed in a windows environment and converted to autocode by the simulation software. Model-based software is user friendly and allows for easy manipulation of models, function blocks, signals, etc. The 2-mode hybrid bus testing does not allow for incorporating software of a vehicle control module that is written in C code (previously existing C code or legacy).

As an alternative to HIL testing, software in-the-loop (SIL) testing may be performed. SIL testing includes automotive control system simulation where behavior of all or a portion of a control algorithm is obtained by executing actual target embedded processor software of a vehicle control module in a simulation computing environment. SIL testing includes simulating loads, such as inputs and outputs of: a controller area network (CAN); control modules; plant models; sensors; etc. In a SIL testing environment, targeted software, such as software of a transmission control module (TCM), is linked virtually to a plant. SIL testing does not require special plant associated hardware. A plant model simulates the plant (e.g., engine, transmission or vehicle dynamics). The plant model receives inputs from a simulated control module and generates outputs, which may be fed back to the simulated control module. The virtual linking of targeted software to a plant model allows a vehicle system to be evaluated early in a development cycle.

In the following description the term task refers to a software function performed during a simulation or, an item, function or step performed during a method. A function refers to a subroutine or subprogram that is a portion of code within a larger program. A task may include multiple sub-tasks.

Also, in the following description the term ring refers to a set of tasks or functions. A SIL block (or block) may include one or more rings and is used to simulate a control module of a vehicle. For example, a transmission control module of a vehicle may be simulated via a transmission block. A block may be a system block, a function block or a null block. A system block is connected to a run time operating system and performs functions and tasks associated with that block. A function block executes a function for a particular portion of a system or model. A null block provides access to memory.

In addition, in the following description the term model refers to one or more SIL blocks and corresponding inputs and outputs and connections between the SIL blocks. A model may include multiple sub-models. For example, a vehicle simulation system model may include a control model with a control SIL block and plant models of, for example, an engine and transmission. A plant model refers to a model that is used to simulate operation of a vehicle hardware component and/or system, such as a model of an engine, a transmission, a controller area network bus, a sensor, etc.

In FIG. 1, a vehicle development process diagram is shown incorporating a vehicle simulation model (VSM) 10 that when executed performs SIL testing. Control modules of a vehicle are tested using the VSM 10. The simulation includes simulation of one or more vehicle control modules, vehicles components or systems, such as an engine, a transmission, sensors, actuators, network buses, etc. After simulation testing, model-based code is converted to autocode, as shown by window 12, which has autocode 14. The autocode 14 is incorporated with the rest of a target software build with autocode 16 shown in window 18. The autocode 14 along with the rest of target software are compiled, linked, and built for executable. The target software build is downloaded via a test computer 20 to in-vehicle target controller (target control module), which then controls vehicle operation associated with the vehicle control module during a bench test. The bench test may include software validation, calibration and evaluation.

Figure 2:
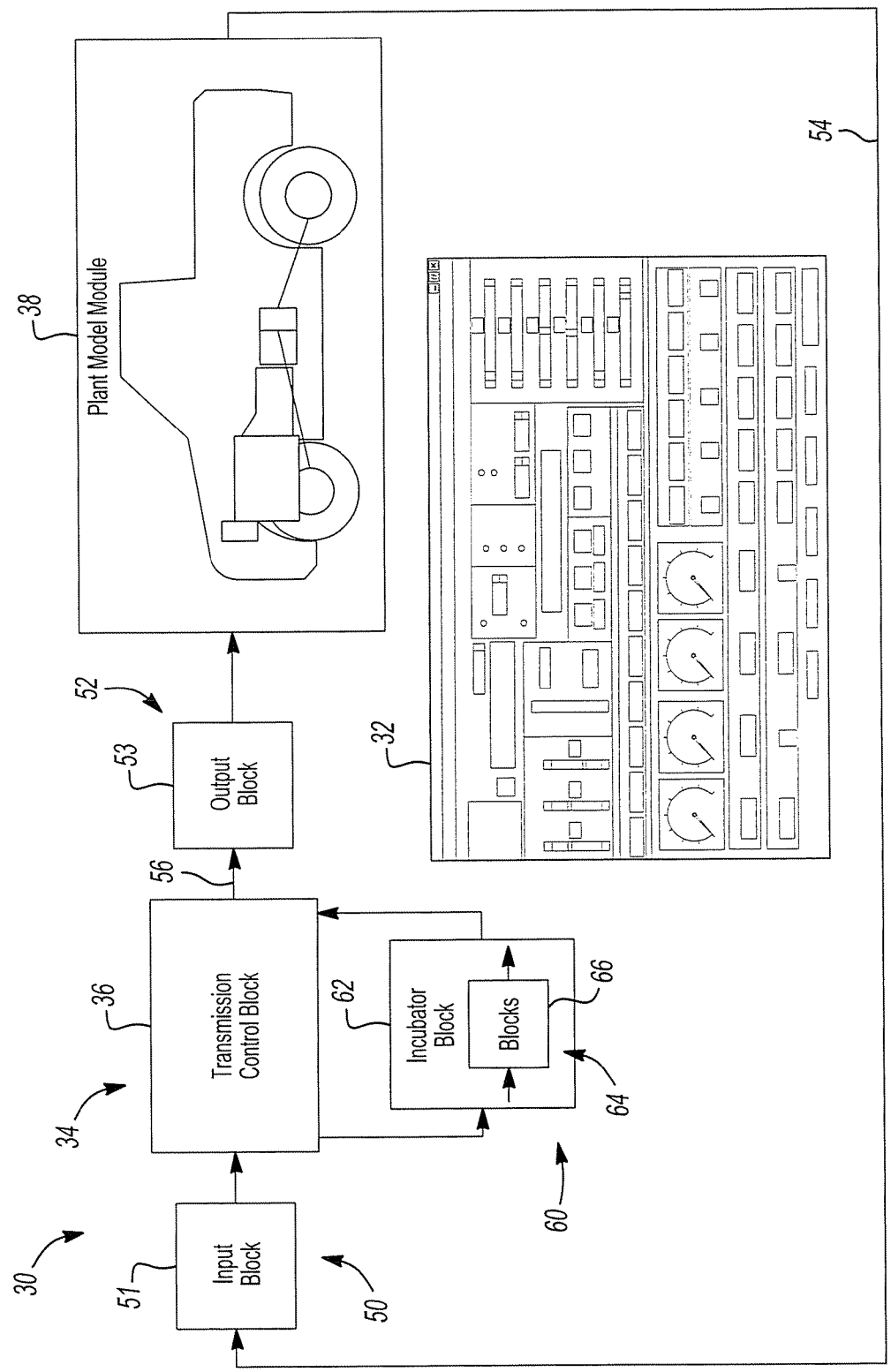
FIG. 2 is a diagram of a vehicle simulation model and a graphical user interface (GUI) in accordance with the present disclosure.

In FIG. 2, a diagram of a VSM 30 and a graphical user interface (GUI) 32 is shown. The VSM 30 is used to simulate operation of software and hardware based vehicle components and/or systems. Simulation test results are generated and shown via the GUI 32 and/or a plotting GUI (described below) for evaluation purposes.

In the example show, the VSM 30 includes a transmission control model 34 with transmission control block 36 and plant models 38 with plant blocks. Examples of plant blocks are shown in, for example, FIGS. 4 and 5. The transmission control model 34 simulates a transmission control module (TCM) of a vehicle. Example TCMs are a dual clutch transmission (DCT) control module and an automatic transmission control module (e.g., a 6-speed clutch-clutch type control module).

The transmission control block 36 may have corresponding files with dynamic link library (DLL) code (model-based code), source code (e.g., c-code and Legacy code), hand code, etc. The transmission control block 36 may also have corresponding files with autocode. The autocode may be associated with SIL models and based on algorithms for respective modules of the TCM. The autocode may be generated using simulation software, such as Simulink™.

The plant models 38 may include, for example, an engine plant model (simulating behavior of the combined engine hardware and engine control software) and a transmission plant model, which simulate outputs of an engine and a transmission. The plant models 38 may include other vehicle models, such as sensor models, actuator models, etc. A single plant model may be used to simulate more than one vehicle component and/or system.

The VSM 30 may also include an input simulation model 50 with an input block 51 and an output simulation model 52 with an output block 53. The input simulation model 50 simulates sensor signals, hardware inputs and outputs and CAN inputs to the TCM based on outputs 54 from the plant models 38. The outputs 54 of the plant models 38 are fed back to the input simulation model 50 providing a closed feedback loop. The output simulation model 52 simulate output signals from actuators, hardware inputs and outputs and CAN outputs to the plant models 38 based on outputs 56 of the transmission model 36.

Figure 4:
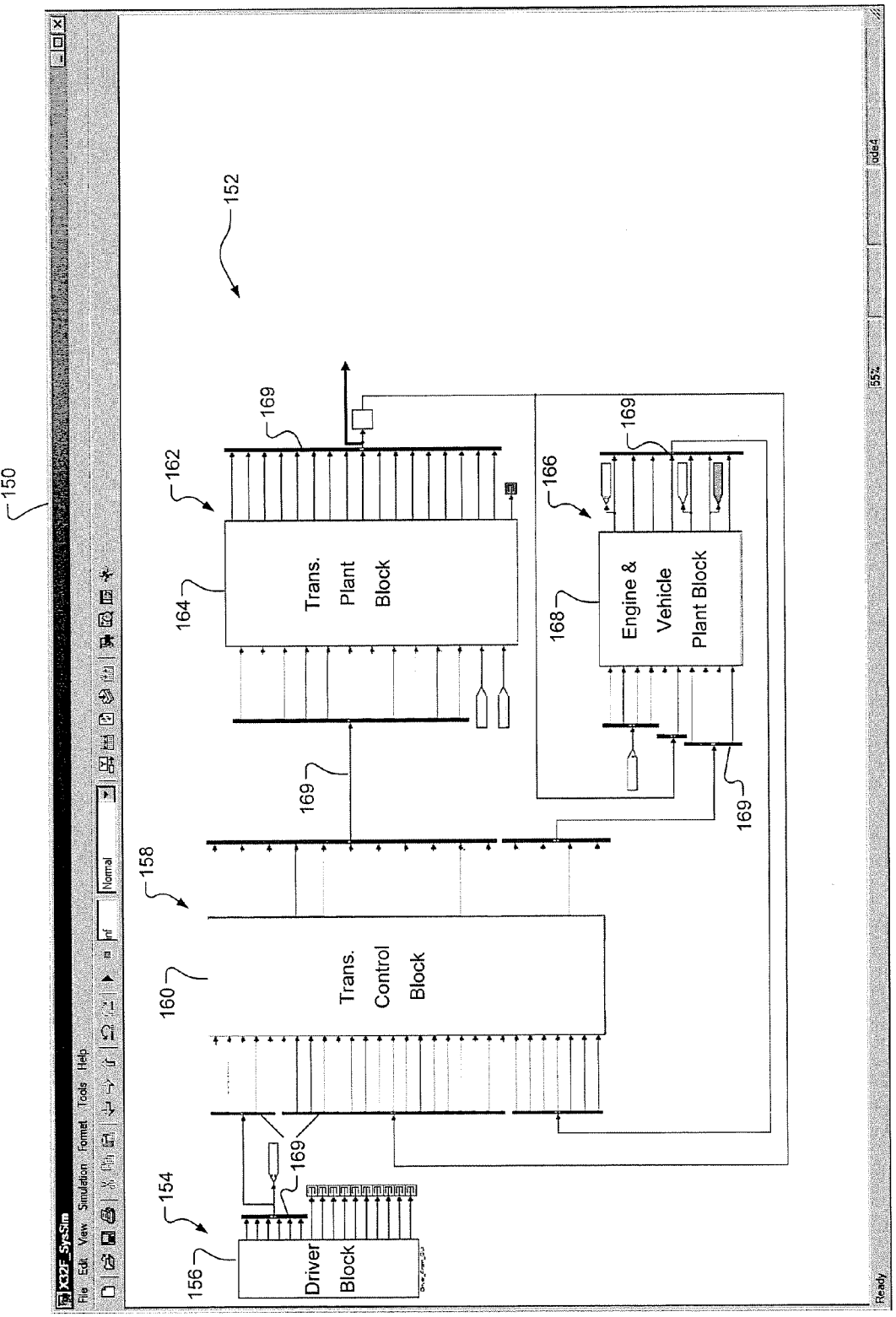
FIG. 4 is a view of a window a portion of another vehicle simulation model in accordance with the present disclosure.
Figure 9:
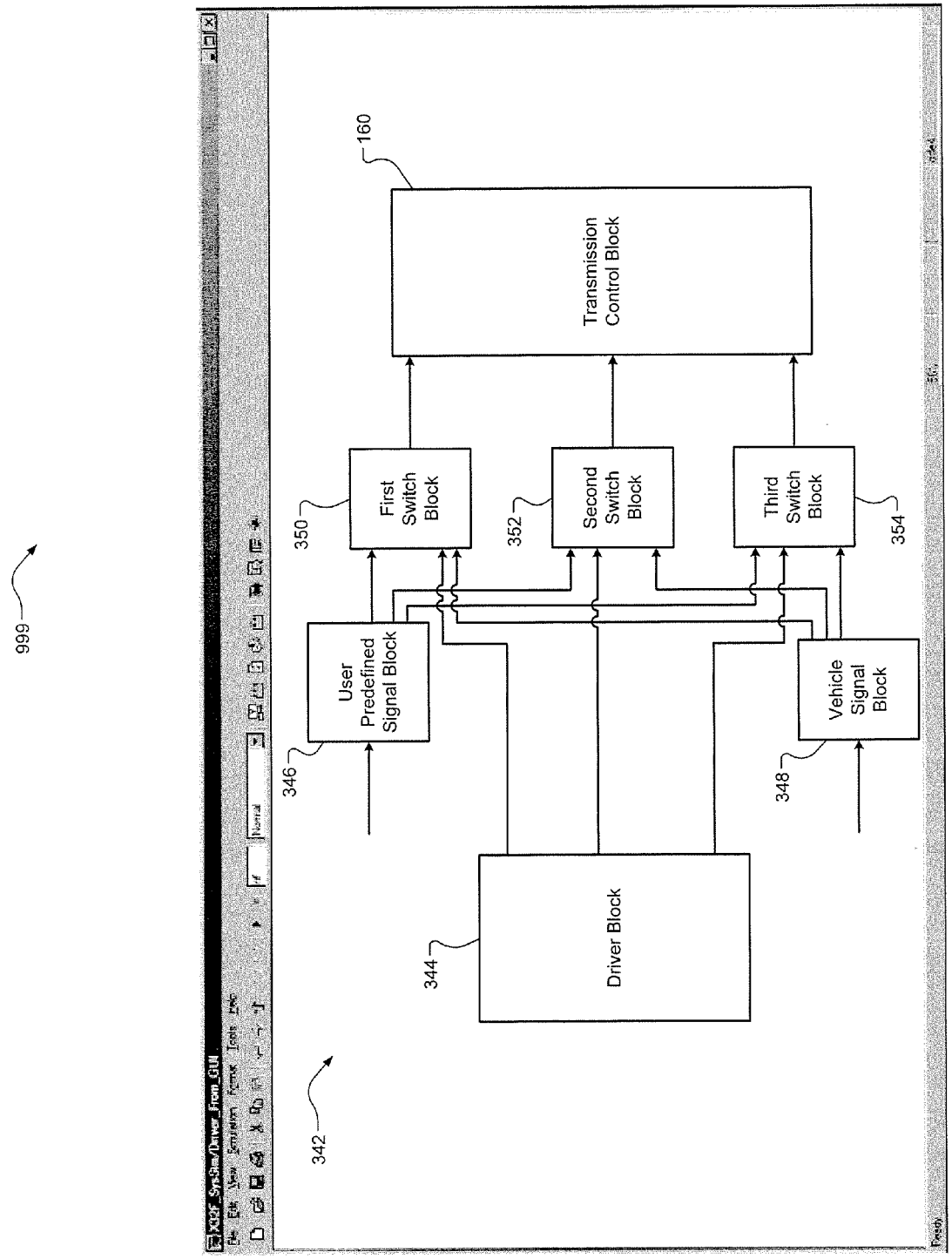
FIG. 9 is a view of a window with an input signal model in accordance with the present disclosure.
Figure 10:
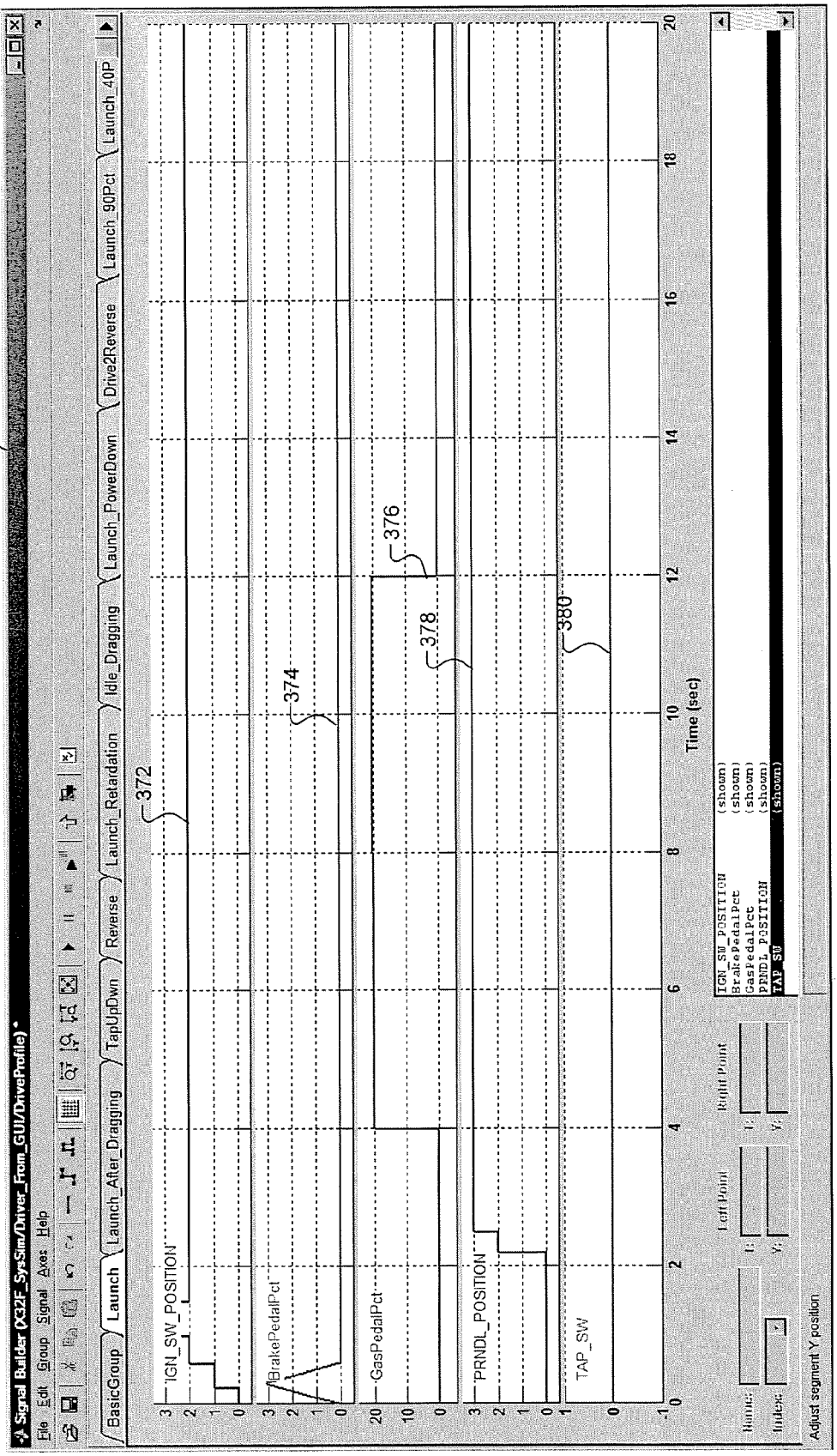
FIG. 10 is a view of a window with predefined signal plots in accordance with the present disclosure.
Figure 13:
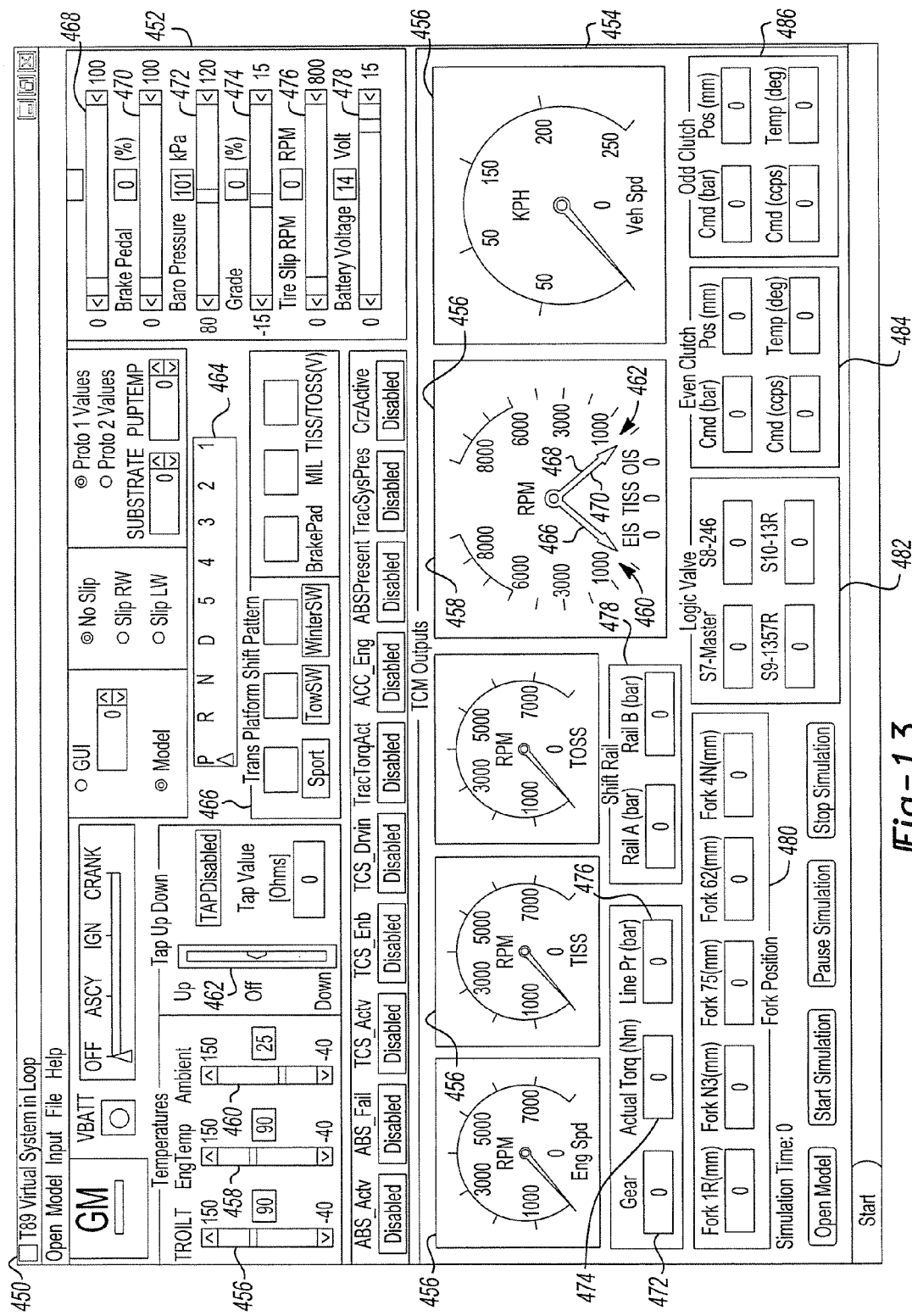
FIG. 13 is a view of a GUI window in accordance with the present disclosure.

The sensor signals, hardware inputs and outputs and CAN inputs may be provided using 3 different techniques. The techniques may be selected via selection blocks (shown in FIG. 9) of a driver input block. An example driver input block is shown in FIGS. 4 and 9. The first technique includes manually entering inputs via the GUI 32. Another example of a GUI is shown in FIG. 13. The second technique includes accessing predefined and stored input signals. Examples of predefined and stored input signals are shown in FIG. 10. The third technique includes accessing recorded vehicle signals. For example, a recorded vehicle signal may be a stored signal generated from a temperature sensor of a vehicle. The recorded vehicle signal may be used during a simulation as an input to the transmission model 36.

The VSM 30 further includes an incubator model 60 with an incubator block 62. The incubator block 62 may include bypass and/or prototype model(s) 64 and corresponding block(s) 66. Each of the blocks 66 may have a corresponding algorithm and be associated with a particular ring of the transmission model 36. The bypass models 64 may be used to replace or may be used as an alternative to model(s) in the transmission model 36. For example, the transmission model 36 may include a first model (first version) that simulates a ring. The incubator block may include a second model (second version) that simulates the same ring as that of the first model. Code associated with the first model and/or the second model may be executed during a simulation. This is further described below.

The prototype models may be distinct from and perform different functions than the models of the transmission model 36. As an example, the transmission model 36 may have N sub-blocks that simulate N rings, where N is an integer greater than 2. A prototype model may correspond to a ring other than the N rings.

Figure 3:
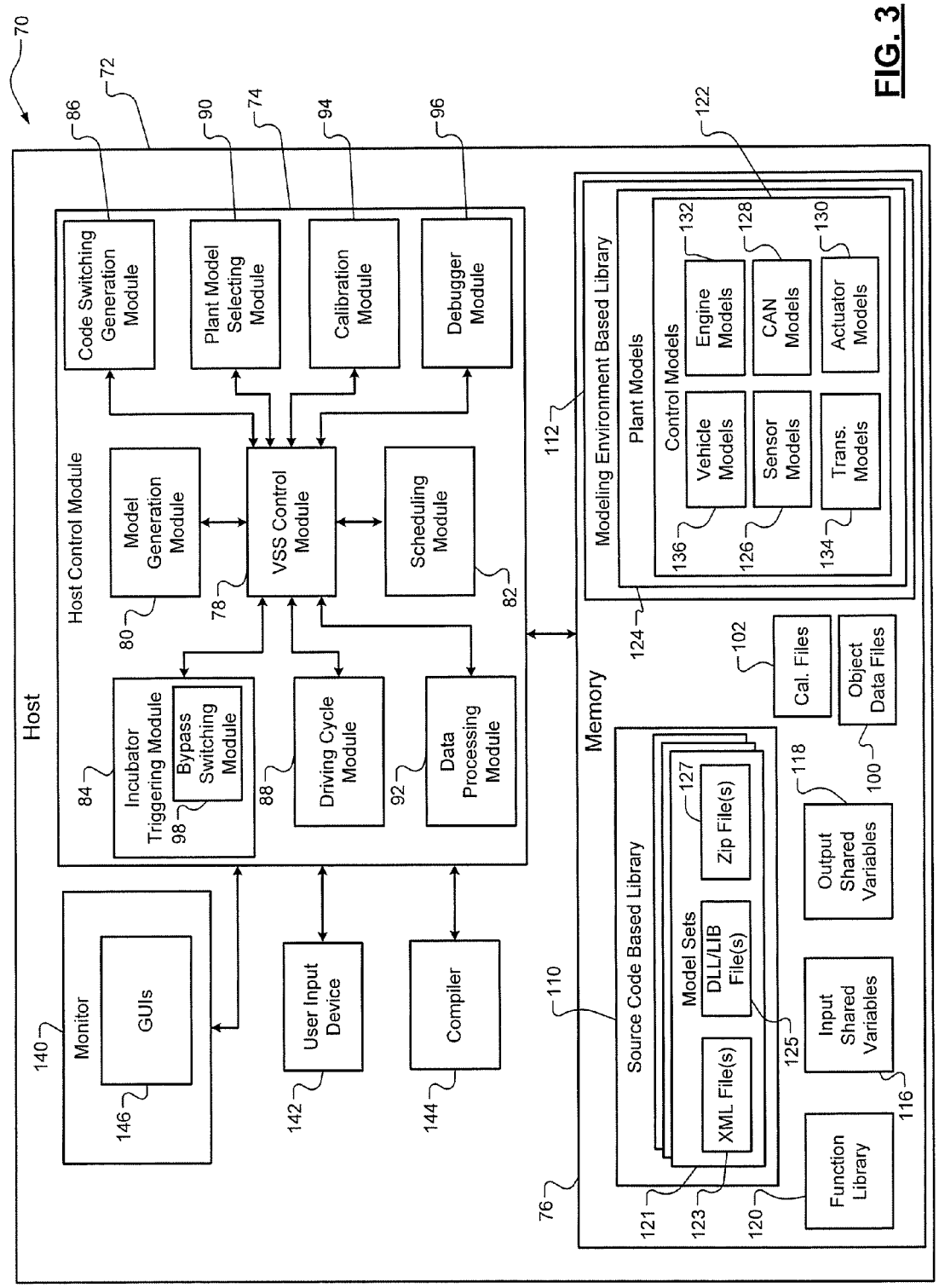
FIG. 3 is a functional block diagram of a vehicle simulation system in accordance with the present disclosure.

Referring now also to FIG. 3, a functional block diagram of a vehicle simulation system 70 is shown. The vehicle simulation system 70 includes a host 72 with a host control module 74 and memory 76. The memory 76 may be remotely located from the host 70 and accessed via a network or may be located within the host 72, as shown. The host control module 74 includes a vehicle system simulation (VSS) control module 78 that controls simulation of one or more vehicle control modules, components and systems of a vehicle. The VSS control module 78 may control: converting source code and/or hand code to model-based code (e.g., dll code); combining of model-based code generated from source code and model-based code generated via simulation software; and conversion of model-based code to autocode.

The host control module 72 also includes a model generation module 80, a scheduling module 82, an incubator triggering module 84, a switch generation module 86, a driving cycle module 88, a plant model selecting module 90, a data processing module 92, a calibration module 94 and a debugger module 96.

The model generation module 80 generates SIL models and corresponding blocks. For example, the model generation module 80 may be used to generate the VSM 30, the transmission model 34, the input model 50, the output model 52, and the plant models 38. The model generation module 80 may generate bypass and/or prototype models. The model generation module 80 may set up the bypass and/or prototype models (new models) including hooking inputs and outputs of the new models to objects of, for example, the transmission control block. Hooking may refer to, for example, connecting the inputs and outputs of a block to signal lines or nodes of a block and/or model. Objects may be nodes, signal lines, inputs, outputs, stored variables, etc. The model generation module 80 is further described with respect to FIGS. 31 and 32.

The scheduling module 82 schedules the order in which tasks are performed. The scheduling module 82 may be event and/or time based. Tasks may be performed based on conditions and or may be performed, for example, in a sequential order. As an example, a series of tasks may be performed upon the occurrence of a certain condition. Multiple tasks may be performed during the same time period. The scheduling module 82 may schedule algorithm model tasks, component software tasks, and control system software tasks.

A user may schedule and re-schedule a task to be performed at various times. For example only, when a function is scheduled in an operating system tasks list, a user may select the function from the functions task list. The user may drag the selected function from a viewing pane into another viewing pane and more particularly to one of the scheduled tasks. When the user ends the selection of a function, the scheduling module 82 inserts the function above or below the one of the scheduled tasks to re-schedule the function. The scheduling module 82 may also disable the function and mark the function as disabled when the user re-schedules the function within the operating system tasks list.

The user may also bypass a scheduled task in favor of another task. For example only, when a function is scheduled in the operating system tasks list, the user may select the function for bypassing. The user may select the function for bypassing, for example, by right clicking the function and selecting a "bypass" option. The user may then select another function from the functions task list to be performed instead of the function when the function is to be performed. In this manner, the function may be bypassed.

A function may be bypassed in an underlying dll file manually. Header files associated with performing the function may be modified to indicate the bypass. New hooks may be created to connect a new function while hooks associated with the bypassed function are disabled. This allows the new function to be performed in replacement of the bypassed function. Set, clear and add hook commands may be used in corresponding code to create, set, remove, and disable hooks. This allows the dll code when executed to call the new function and not the bypassed function.

Figure 15:
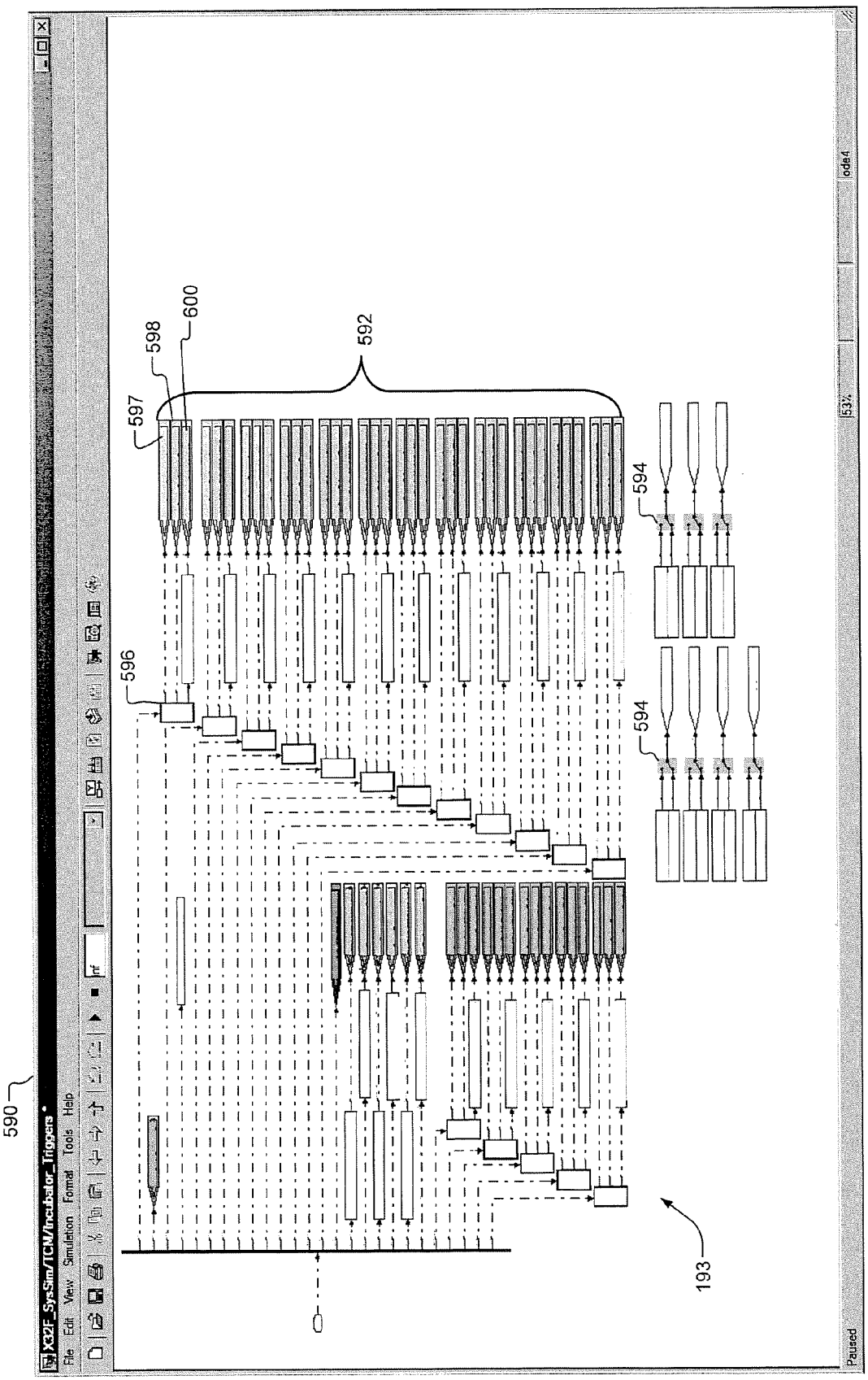
FIG. 15 is a view of a window with incubator triggers and bypass switches in accordance with the present disclosure.
Figure 16:
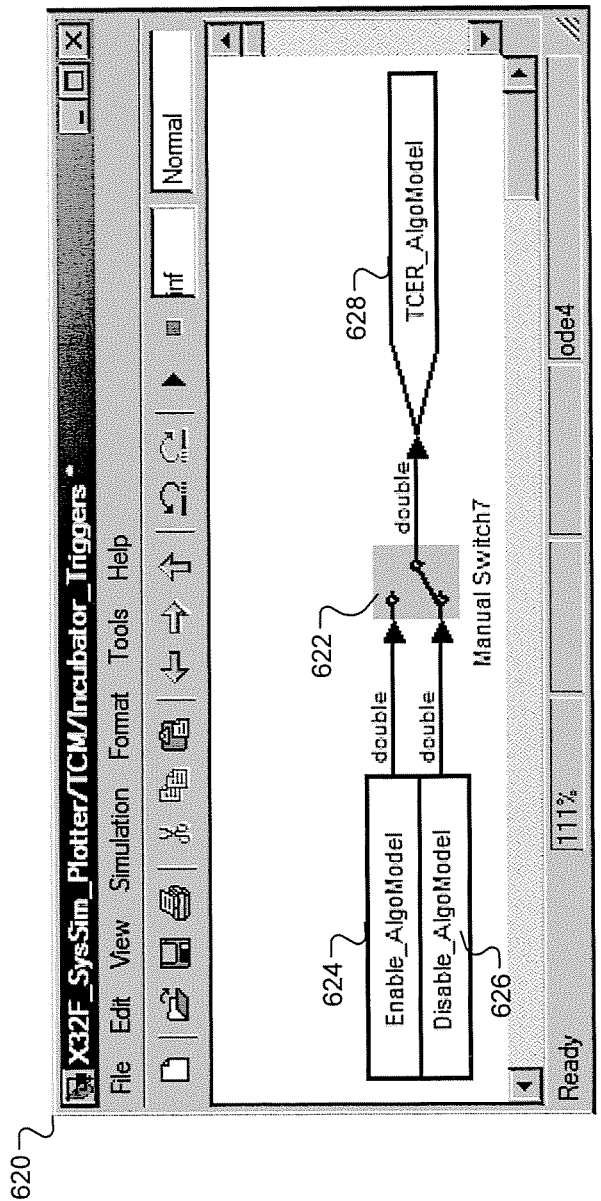
FIG. 16 is a view of a window illustrating a bypass switch configuration in accordance with the present disclosure.

The incubator triggering module 84 sets up and controls triggering of incubator blocks (i.e. bypass blocks and/or prototype blocks). An example of a triggering setup is shown in FIG. 15. The switch generation module 86 may be part of the incubator triggering module 84 and generates and sets up bypass switches for the enabling of bypass models. Example bypass switches are shown in FIGS. 15 and 16. The incubator triggering module 84 may include a bypass switching module 98, which changes state of the bypass switches based on received user input signals.

The driving cycle module 88 controls inputs to one or more control models of the VSM 30. For example, the driving cycle module 88 may select between and supply user inputs, predefined signal inputs and stored vehicle signals to the transmission control block 36. This selection is further described with respect to FIG. 9.

The plant model selecting module 90 selects a fidelity level of one or more plant models, such as the fidelity level of the plant models 38. A fidelity level refers to the complexity of the plant model and the degree to which the plant model accurately simulates corresponding components and/or systems of a vehicle. For example, a plant model may simulate a vehicle system with or without simulation of sensors. For example, when a low plant fidelity level is selected, an engine may be simulated and speed of the engine may be directly fed back to the transmission control block 36. As an alternative, when a high plant fidelity level is selected, operation of the engine and an engine speed sensor may be simulated. Output of an engine speed sensor block may be fed back to the transmission control block 36. Simulation of a plant model with a high plant fidelity level may better match vehicle performance than simulation of a plant model with a low plant fidelity level. Processing time is generally longer for high plant fidelity levels versus low plant fidelity levels.

The data processing module 92 selects objects to monitor. Data associated with the monitored objects is stored as object data files 100 in the memory 76. The data processing module 92 is further described with respect to FIG. 17. The calibration module 94 allows for calibration of variables or stored values (in calibration files 102) in the memory 76. The calibration module 94 may adjust values of various types including boolean values, scalar values, tabular values, etc. The debugger module 96 is used to debug code of, for example, the VSS 30. Debugging is further described with respect to FIG. 29.

The memory 76 further stores, for example, a source code based library 110, a modeling environment based library 112, input shared variables 116, output shared variables 118, and a function library 120. The source code based library 110 includes models (or model sets 121) that are generated based on source code and/or hand code. The source code and/or hand code is converted to model-based code that can be loaded in a model-based environment. The models and corresponding blocks may be viewed in a simulation environment as models generated using model-based software. The models may include .xml files 123, .dll and .lib files 125 and .zip files 127. The .xml files 123 are used by calibration software to generate calibration windows for adjusting calibration values. The .dll and .lib files 125 refer to dynamic link library (dll) and static library (lib) files, which are used by model-based simulation software to provide GUIs with models and blocks, as shown for example in FIGS. 4-6. The .zip files 127 may include the .xml files, the .dll files and the .lib files. The .zip files may also include definition files, calibration files, and zipped source code.

The modeling environment based library 112 includes models generated in the modeling environment used model-based simulation software. The models may include control models 122, plant models 124, sensor models 126, CAN models 128, and actuator models 130, etc. The source code based library 110 and the modeling environment based library 112 may include ring libraries with algorithm models, such as transmission algorithm models.

The plant models 124 may include engine models 132, transmission models 134, and/or other vehicle system models 136. The plant models 124 may include the sensor models 126, the CAN models 128 and the actuator models 130. The sensor models 126 may be used to simulate sensors of a vehicle, such as engine speed sensors, vehicle speed sensors, temperature sensors, pressure sensors, flow rate sensors, etc. The CAN models 128 may be used to simulate output signals received from a CAN of a vehicle. The actuator models 130 may be used to simulate actuators, such as spark plugs, electric motors, throttles, solenoids, etc. of a vehicle.

The input and output shared variables 116, 118 may refer to variables that are shared by blocks of a model. The input and output shared variables 116, 118 may be global variables or may be assigned to certain blocks and/or functions. The function library 120 may include additional standard blocks, such as mathematical functions used to generate one or more blocks of a ring.

The host 72 may also include a monitor 140, a user input device 142, and a compiler 144. The monitor 140 displays GUIs 146 generated by the host control module 74. The user input device 142 may be, for example, a keyboard, a mouse, a touch screen, etc. The user input device 142 may include the monitor 140. The compiler 144 may compile source code, hand code, model-based code (.dll and .lib code) and/or auto-code.

In FIG. 4, a view of a window 150 with a first portion 152 of a VSM is shown. The VSM includes: a driver model 154 with a driver block 156; a transmission control model 158 with a transmission control block 160; a transmission plant model 162 with a transmission plant block 164; and an engine and vehicle plant model 166 and engine and system plant block 168. Each of the blocks 156, 158, 164, 168 have respective input and output signals 169, which are provided to each other, as shown. The connection of each of the signals may be setup by a user via the window 150. Internal configurations of each of the blocks 156, 158, 164, 168 may be developed by opening respective windows (GUIs) for each of the blocks 156, 158, 164, 168. This may be done, for example, by double clicking a selected one of the blocks 156, 158, 164, 168. As an example, internal configuration of the transmission control block 160 is shown in FIG. 5.

As an example, the driver block 156 may generate various signals, which may be provided to the transmission control block 160 or to other blocks of the VSM. The driver block generated signals may include an ignition switch signal, a brake pedal signal, a gas pedal signal, a transmission shifter signal, a transmission tap signal, an air conditioning clutch signal, a battery voltage signal, an engine coolant signal, a wheel slip signal, a vehicle speed signal, a grade signal, a barometric pressure signal, an ambient temperature signal, an oil temperature signal, etc. The transmission control block 160 may generate various signals which may be provided to the transmission plant block 164. The transmission control block generated signals may include a pump speed signal, odd and even clutch command signals, shift rail pressure signals, solenoid valve control signals, transmission torque request signals, etc., depending on the transmission being simulated. For vehicle system simulation with a DCT a different set of output control signals for 6-speed clutch-to-clutch transmission system simulation may be generated.

The transmission plant block 164 may generate various signals which may be provided to the engine and vehicle plant block 166. The transmission plant block generated signals may include pressure signals, an engine speed signal, odd and even shaft speed signals, transmission torque signals, odd and even clutch signals, fork position signals, odd and even clutch pressure signals, etc. The engine and vehicle plant block 166 may generate various signals which may be feedback to the transmission control block 160. The engine and vehicle plant block generated signals may include an engine torque signal, a coolant temperature signal, an air conditioning signal, a wheel speed signal, a transmission speed signal, a vehicle speed signal, an engine air flow signal, etc.

Figure 5:
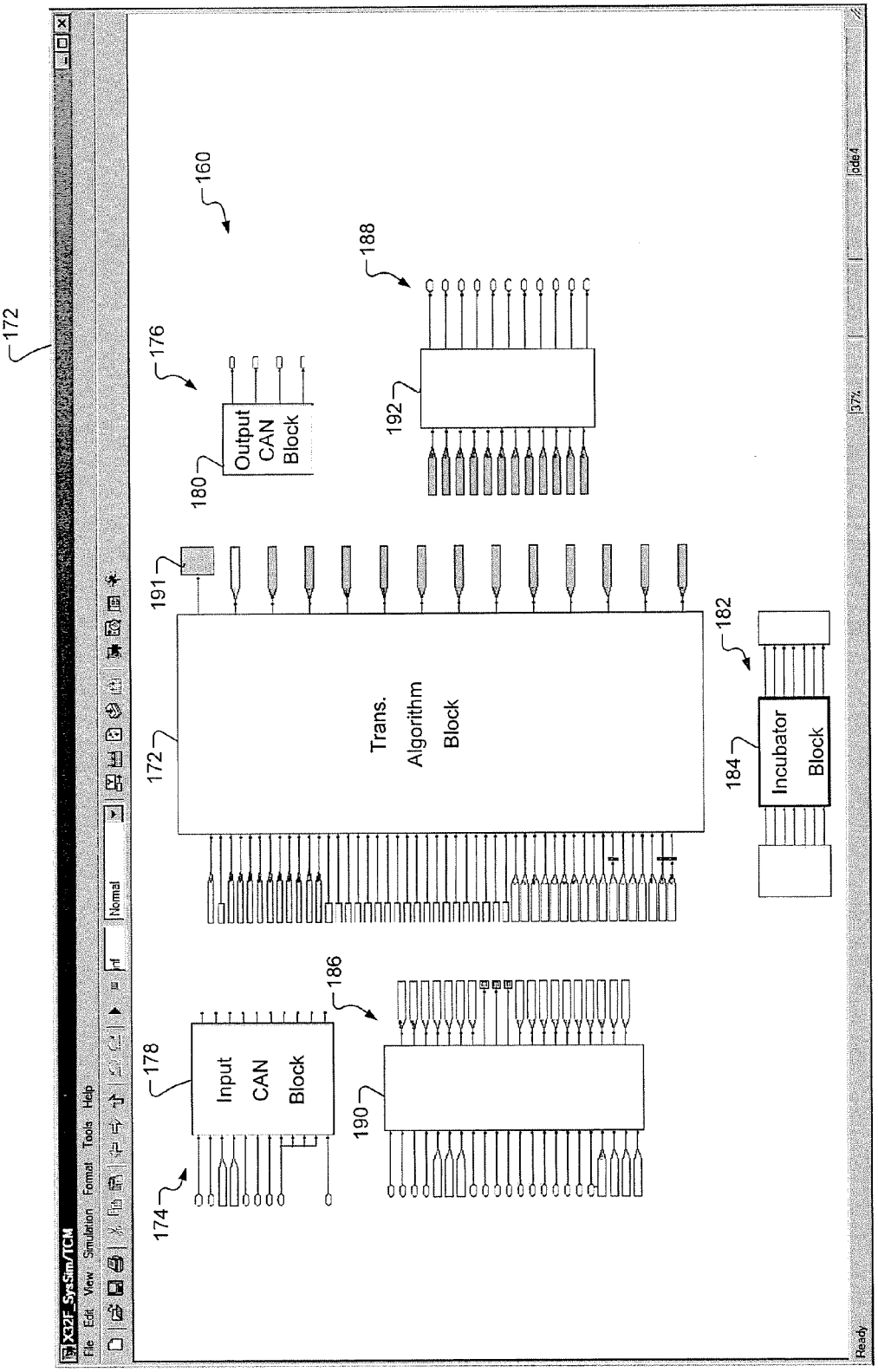
FIG. 5 is a view of a window of a transmission control block (transmission control module block) of the vehicle simulation model of FIG. 4.

In FIG. 5, a view of a window 170 of the transmission control block 160 of the VSS of FIG. 4 is shown. The transmission control block 160 includes a transmission algorithm block 172 and may further include input and output CAN models 174, 176 with input and output CAN blocks 178, 180, an incubator model 182 with an incubator block 184 and other models 186, 188 and blocks 190, 192.

The input CAN block 178 has generates signals received by the transmission control block 160. The transmission algorithm block 172 generates signals that are received by the output CAN block 180 and/or the incubator block 184. The incubator block 184 generates output signals, which may be received by the transmission algorithm block 172. The input signals of the incubator block 184 may be pulled from internal blocks of the transmission algorithm block 172. The output signals of the incubator block 184 may be provided to blocks within the transmission algorithm block 172.

The incubator model 182 and incubator block 184 may not be included in the VSS. System simulation may use transmission control module software embedded in the transmission algorithm block 172 without use of the incubator module 182. As an example, transmission control source code (e.g., C code) may be directly modified, transmission control module software may be rebuilt, and changes may then be tested via simulation. This process may be circumvented and/or minimized by using the incubator model 182.

The incubator block 184 may be a sub-system that includes model based algorithms. Functional rings may be modeled and included in libraries of the incubator block 184. Enhancements and changes to software ring models in the incubator block 184 may be developed and verified during a simulation. The algorithm models in the incubator block 184 may be auto-coded to c-files for implementation and patch build testing on a target vehicle control module.

Functions of the incubator block 184 may be triggered based on one or more trigger output signals of the transmission algorithm block 172. The trigger output signals are represented by box 191. The trigger signals are received by a demultiplexer 193 shown in FIG. 15.

Figure 6:
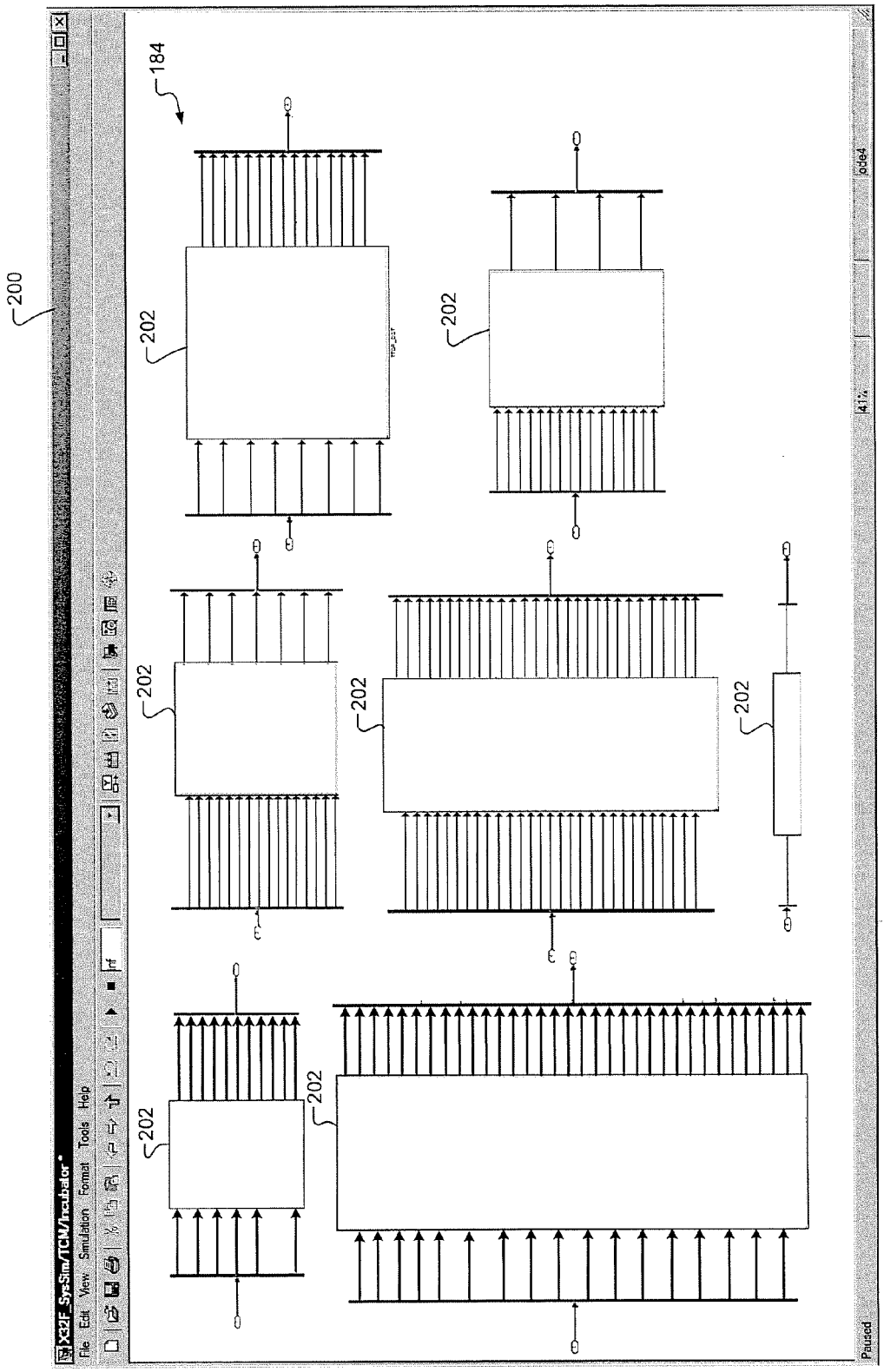
FIG. 6 is a view of a window of an incubator block (algorithm model) of the vehicle simulation model of FIG. 4.

Referring also to FIG. 6, a view of a window 200 of the incubator block 184 is shown. The blocks 202 include respective inputs and outputs which may be shared among the blocks 202 and/or with blocks external to the incubator block 184.

Figure 7:
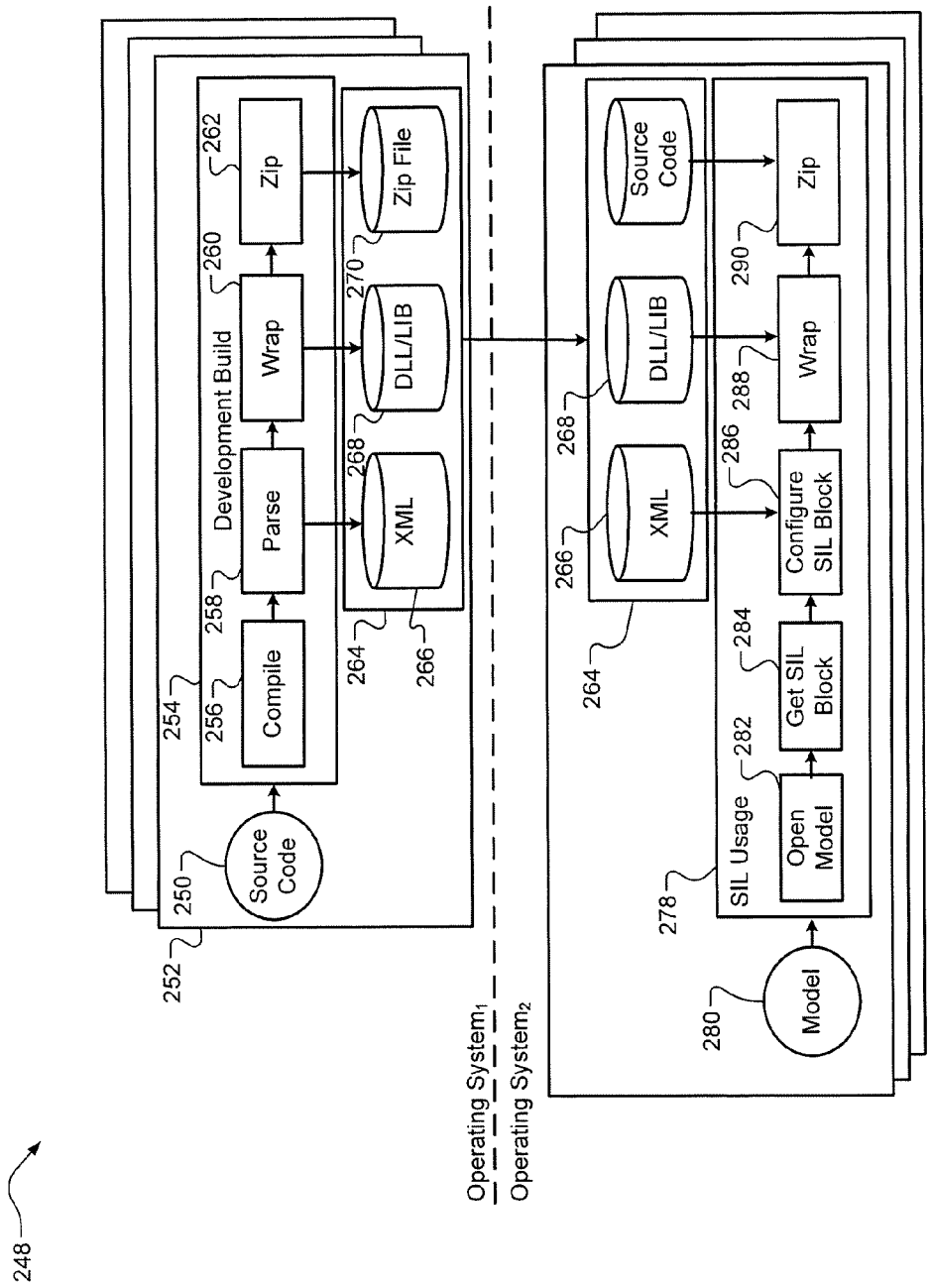
FIG. 7 is a functional block diagram illustrating a SIL process in accordance with the present disclosure.

In FIG. 7, a functional block diagram illustrating a SIL process is shown. The SIL process 248 includes a build process and a usage process. The build process may be supported by a first operating system (e.g., Linux™) The usage process may be supported by a second operating system (e.g., Windows™).

The build process includes converting source code 250 and/or hand code of a build record 252 to produce components or blocks that are used in the usage process. A development build process 254 is performed which includes performing: cross compilation of source code (compile box 256), parsing source code (parse box 258), creating static and dynamic link libraries (wrap box 260), zipping source code (zip box 262), and providing resulting files in a zip file for the usage process. The build process provides a model set 264, which may be stored in a zip file. The model set includes .xml files 266, .dll and .lib files 268 and .zip files 270. The .xml files contain information that describes contents of the .dll files.

The usage process includes using the model sets 264 produced in the build process. This includes providing compiled code from the build process into a model-based environment, such as that provided by Simulink™ The usage process 278 includes opening a model 280, such as a vehicle system model, represented by box 282. A dialog GUI or menu may then be populated with files corresponding to the opened model, represented by get SIL block(s) 284. The SIL block(s) are configured based on the .xml files 266, represented by configure SIL block 286. The opened model is updated based on the .dll and .lib files 268 generated during the build process 254, represented by wrap box 288. The updated model is than executed to simulate a vehicle system, represented by box 290. The simulation may include code debugging and may be based on source code generated during the build process 254.

Figure 8:
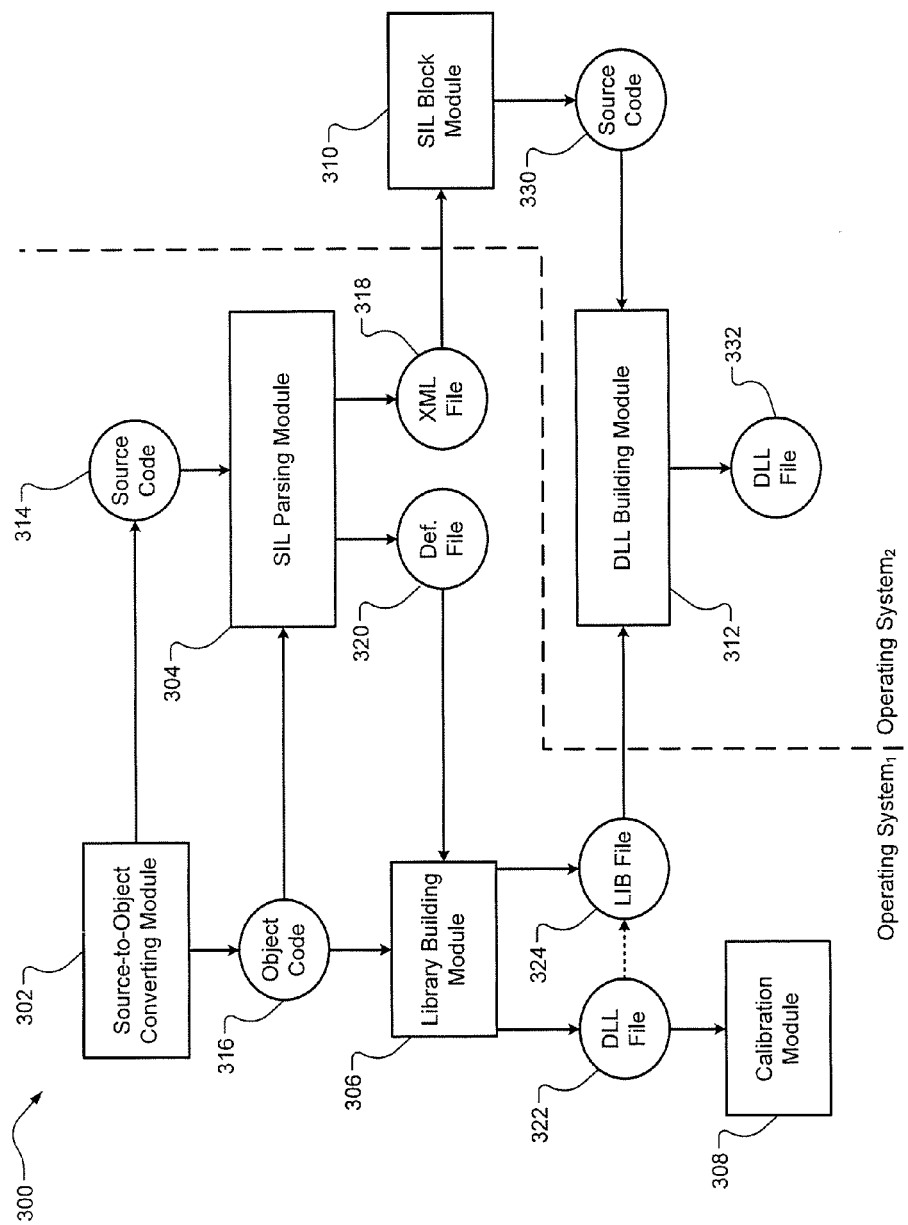
FIG. 8 is a functional block diagram illustrating a coding process of the SIL process of FIG. 7.

In FIG. 8, a functional block diagram illustrating a coding process 300 of the SIL process 248 is shown. The SIL process 248 includes the use of a source-to-object converting module 302, a SIL parsing module 304, a library building module 306, a calibration module 308, a SIL block module 310, and a DLL building module 312.

The source-to-object converting module 302 is a cross compiler that converts source code 314 into object code 316. The source-to-object converting module 302 produces binaries that are compatible for a platform other than the one on which the compiler is run. The source-to-object converting module 302 may, for example, produce object code compatible with Windows™ and not Linux™.

The SIL parsing module 304 extracts software information from both source code 314 and corresponding object code 316. This extracted information is used to produce a .xml file 318 and a definition (.def) file 320. The .xml file 318 contains information describing the source code 314 (i.e., variables, calibrations, functions, etc.). The definition file contains information describing what data is to be exported in libraries.

The library building module 306 produces .dll and .lib files 322, 324 based on the object code and the definition file. The calibration module 308 extracts calibration information from data files and cross compiles the .dll files 322 (model-based code). This extracted information may be used to produce a .xml file.

The SIL block module 310 provides a GUI and reads the .xml file 318, which contains source code information. The GUI presents the information to a user. The SIL block module 310 produces model-based source code 330 based on a user configuration. An example of model-based source code is s-function source code generated using simulation software, such as Simulink™. The DLL building module 312 converts the model-based source code 330 along with a library (.dll and/or .lib files 322, 324) to produce a .dll file 332 that runs in a simulation environment.

In FIG. 9, a view of a window 340 with an input signal model 342 is shown. The input signal model 342 is used to select a driving cycle and includes a driver block 344, a user pre-defined signal block 346, a vehicle signal block 348, and switch blocks 350, 352, 354. The switch blocks 350, 352, 354 selectively provide a driving cycle signal from one of the driver block 344, the user pre-defines signal block 346 and the vehicle signal block 348 to a block downstream from the switch blocks 350, 352, 354. For example, the switch blocks 350, 352, 354 may provide the selected driving cycle signals to the transmission control block 160. Examples of predefines signals are shown in FIG. 10.

In FIG. 10, a view of a window 370 is shown with predefined signal plots. The window 370 includes an ignition switch position signal 372, a brake pedal position signal 374, a gas pedal position signal 376, an automatic transmission shifter position signal 378, and a transmission gear tap signal 380. The signals 372-380 may be stored in the memory 76 of FIG. 3.

Figure 11:
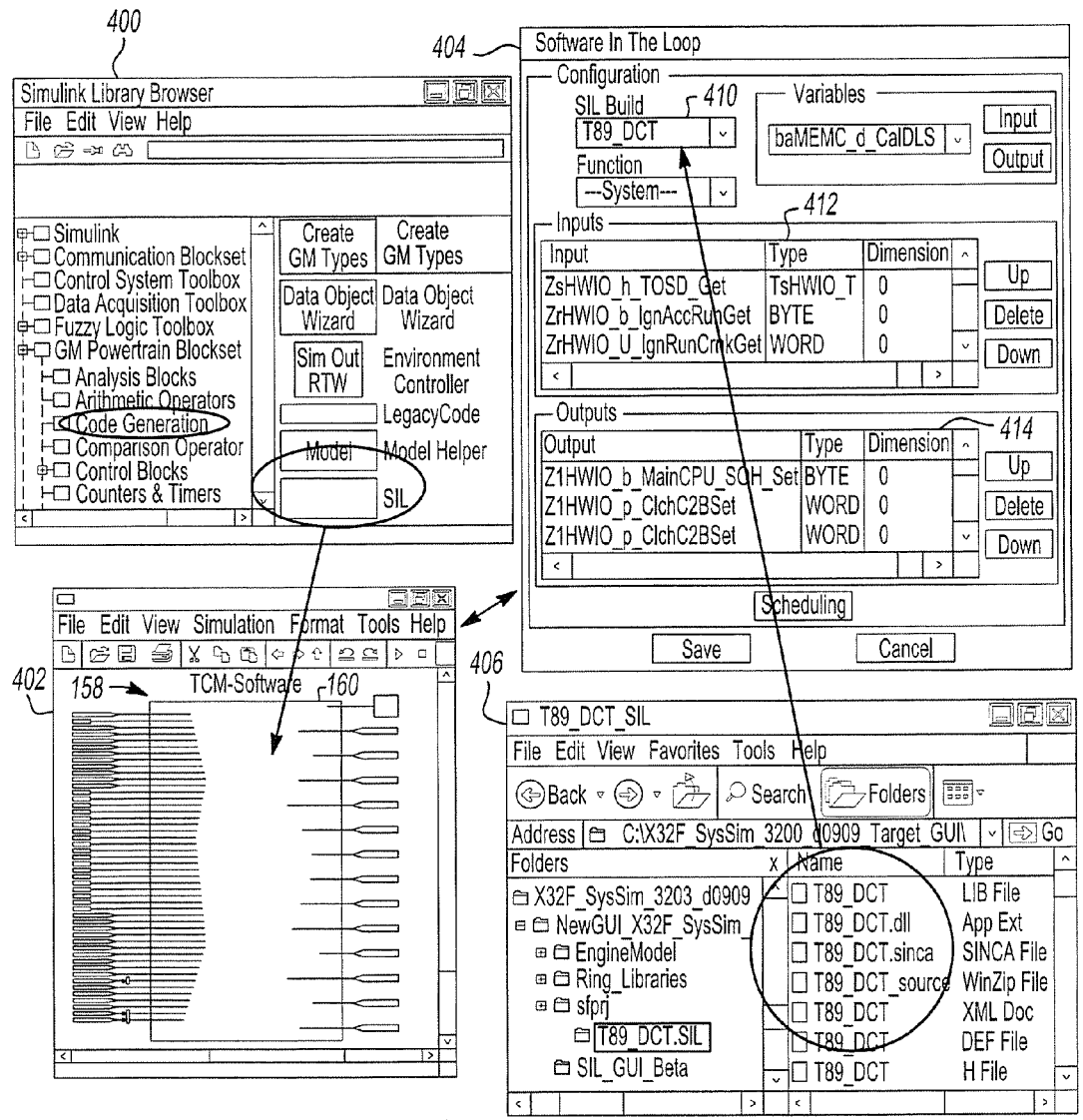
FIG. 11 is a view of multiple windows associated with a SIL block build process in accordance with the present disclosure.

In FIG. 11, a view of multiple windows associated with a SIL block build process is shown. A library browser window 400, a model window 402, a SIL window 404 and a model selection window 406 are shown. A user of a simulation system may open the library browser window 400 to generate a SIL block, such as the transmission control block 160. A code generation directory is selected as well as a SIL block.

Configuration of the SIL block and corresponding model may be performed via the model widow 402 and the SIL window 404. The model window is referred to as a GUI that displays a current model and corresponding blocks. In the model window shown in FIG. 11, the transmission control model 158 and the transmission control block 160 are shown.

The SIL window 404 identifies the name of the current model being configured in a SIL build box 410. Inputs and outputs of the model are respectively listed in an input menu 412 and an output menu 414. The menus 412, 414 may be modified including adding and deleting selected inputs and outputs. The model selection window 406 shows files associated with the current model.

Figure 12:
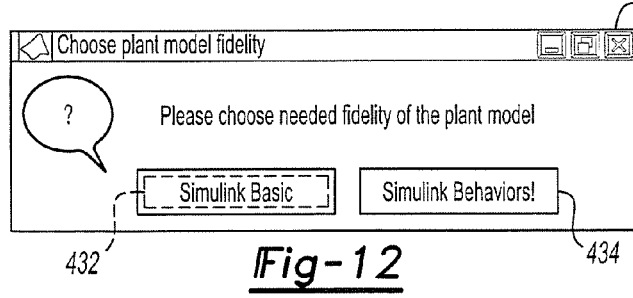
FIG. 12 is a view of a window illustrating plant model fidelity selection in accordance with the present disclosure.

In FIG. 12, a view of a window 430 illustrating plant model fidelity selection is shown. The window 430 includes a first fidelity level selection tab (basic) 432 and a second fidelity level selection tab (behavioral) 434. The first fidelity level or basic level is less than the second fidelity level or behavioral level. Although two levels are shown, any number of levels may be included and selected.

The second fidelity level may include simulation of additional components and/or systems that are not simulated using the first fidelity level. The second fidelity level may include simulation of sensors and clutches not simulated using the first fidelity level. The first fidelity level may simulate a simplified transmission fork actuation system relative to that simulated using the second fidelity level. Loading and processing times associated with the second fidelity level may be longer than loading and processing times associated with the first fidelity level.

In FIG. 13, a GUI window 450 is shown. The GUI window 450 may be generated using, for example, Simulink™ Guide software by MathWorks™. The GUI window 450 includes a user input section 452 and a simulation monitoring and results sections 454. The user input section 452 includes condition and system settings, such as a transmission oil temperature slide 456, an engine temperature slide 458, an ambient temperature slide 460, a transmission gear tap selector 462, an automatic transmission shift selector (PRND54321) 464, transmission shift pattern selection boxes 466, a throttle position slide 468, a brake pedal position slide 470, a barometric pressure position slide 472, a grade slide 474, a tire slip speed slide 476 and a batter voltage slide 478.

The simulation monitoring and results sections 454 may include plant model variables, software variables, control module variables or other vehicle simulation model variables. The simulation monitoring and results sections 454 includes parameter gauges 456, such as for engine speed, transmission input speed, transmission output speed, vehicle speed, etc. One of the parameter gauges may gauge multiple parameters, such as transmission even shaft speed, transmission odd shaft speed, and engine crankshaft speed (shaft speed). Even and odd shafts may refer to shafts of a dual clutch transmission that include a first shaft for even gears and a second shaft for odd gears. An example of this is shown by parameter gauge 458.

The parameter gauge 458 includes two sub-gauges 460, 462. The first sub-gauge 460 includes a first needle 464 that indicates the even shaft speed and a second needle 466 that indicates the engine crankshaft speed. The second sub-gauge a first needle 468 that indicates the odd shaft speed and a second needle 470 that indicates the engine crankshaft speed.

The simulation monitoring and results sections 454 may also include an attained gear box 472, an engine torque box 474, transmission line pressure box 476, shift rail pressure boxes 478, transmission fork position boxes 480, solenoid position and/or pressure boxes 482, even clutch parameter boxes 484 and odd clutch parameter boxes 486. The even and odd parameter boxes may include pressure, position, flow, and temperature boxes. The above-stated boxes indicate simulated parameter values for a given time.

Figure 14:
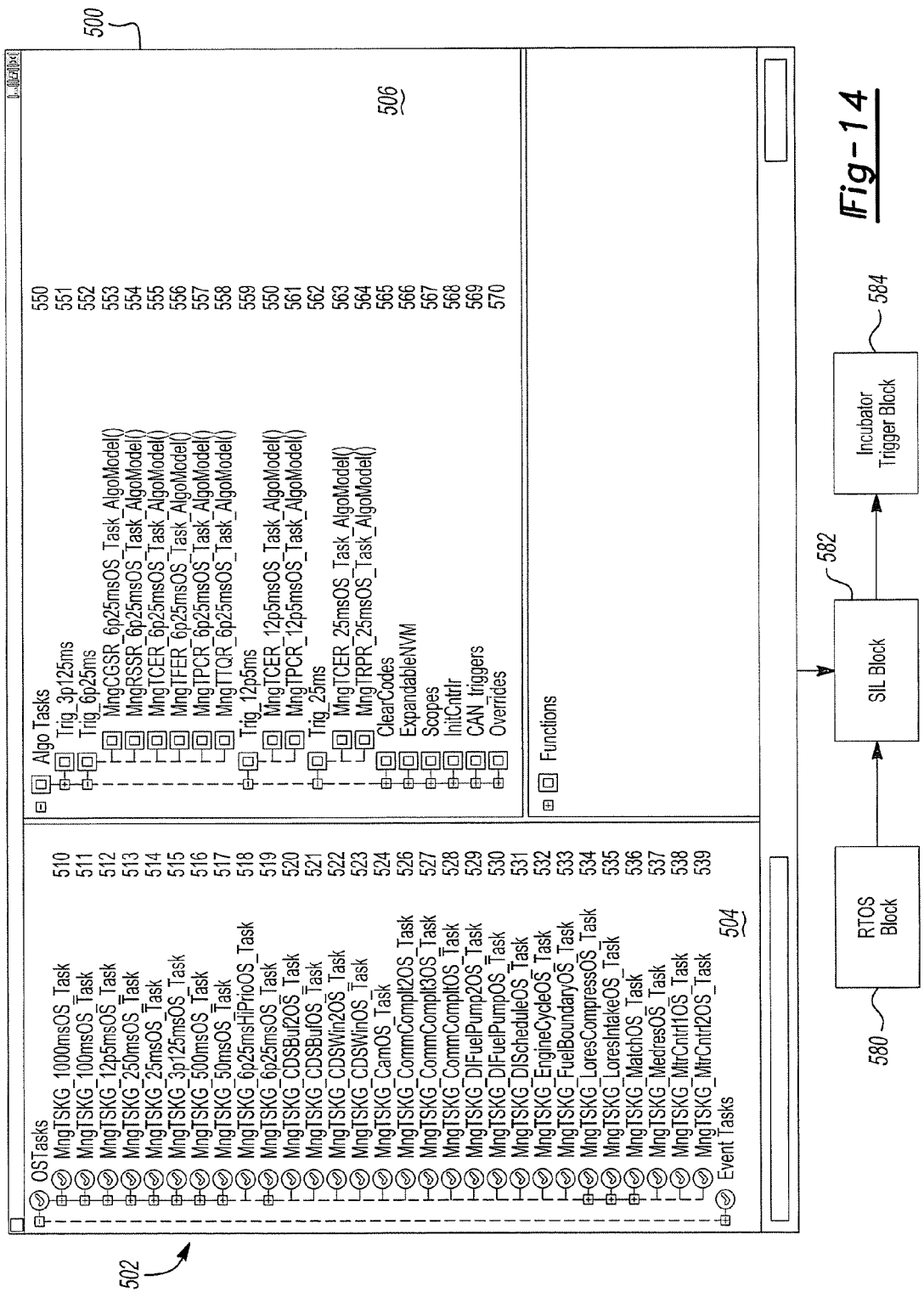
FIG. 14 is a window and functional block diagram of a scheduling system in accordance with the present disclosure.

In FIG. 14, a window 500 and functional block diagram of a scheduling system 502 is shown. The window 500 includes a task list section 504 and an algorithm (algo) task section 506. The task list section lists periodic tasks (OS tasks) 510-539 and event tasks associated with a particular model and/or SIL block. As an example, the tasks may be performed sequentially at predetermined times and initiated based on an event or condition. The algo task section 506 lists triggers 550-570 associated with each of the tasks in the task list section 504. A task may be enabled and disabled by, for example, clicking the task. Trigger calls may be assigned to periodic tasks and in any order of ring calls. The scheduling module 82 of FIG. 3 controls the enabling and disabling of the tasks based on received user input signals, such as that generated through the selection of the tasks in the window 500.

The scheduling system 502 includes the scheduling module 82 which may provide the scheduling window 500 and a run time operating system (RTOS) 580, a SIL block 582 and an incubator block 584. The RTOS 580 serves application requests in nearly real-time. The term real-time referring to time at which events, tasks, and conditions occur or are performed in a vehicle. The SIL block 582 may operate based on signals from the RTOS 580. The SIL block 582 generates triggers, which are provided to the incubator block 584. The triggers are used to enable tasks of blocks in the incubator block, such as bypass blocks and/or prototype blocks.

In FIG. 15, a view of a window 590 with incubator triggers 592 and bypass switches 594 is shown. One or more trigger signal(s) from a control model, such as the transmission control model 160, are received by the demultiplexer 592. The trigger signals are provided to splitters 596, which generate at least three triggers for each ring or block. The three triggers include input and output capture triggers 597, 598 and an execution trigger 600. The input and output capture triggers 597, 598 are used to call signals to incubator blocks and to write (or update) signals from the incubator blocks. The execution trigger 600 is used to trigger tasks of, for example, a ring or block.

The bypass switches 594 may have two or more states. In one embodiment the bypass switches include 2 states, as shown. A first state of a first one of the switches 594 is associated with enabling a previously stored (first) version of a ring (first block) residing in the form of a dll inside the transmission control block 160. The execution trigger is provided directly to the first block when the first switch is in the first state. A second state of the first switch is associated with updated (second) version of the ring (second block or bypass block) existing in the form of algorithm model inside the incubator block 184. The first block is bypassed when the bypass block is enabled. The execution trigger is provided to the bypass block when the first switch is in the second state.

In another embodiment, the switches 594 include a third state which allows a user to enable simulation execution of both the first block and the bypass block. The execution trigger is provided to both the first block and the bypass block when the first switch is in the third state. This allows execution and evaluation of both the first block and the bypass block.

In FIG. 16, a view of a window 620 is shown illustrating a bypass switch configuration. The bypass switch configuration includes a bypass switch 622 that is used to enable a bypass algorithm for a ring. The bypass switch 622 has an enable state 624 and a disable state 626. A trigger 628 is provided to the bypass algorithm when in the enabled state 624. Use of the bypass switches increases ease and reduced time involved in enabling and disabling SIL blocks. In stead of individual tasks being enabled or disabled, groups of tasks associated with, for example, a particular ring may be enabled and disabled via a single switch. This also reduces errors associated with enabling and disabling many tasks on a one-at-a-time basis.

The bypass switches allow for switching between existing SIL blocks and newly generated algorithm-based SIL blocks. This allows for a performance comparison of previous and newly generated SIL blocks via one or more simulations.

Figure 17:
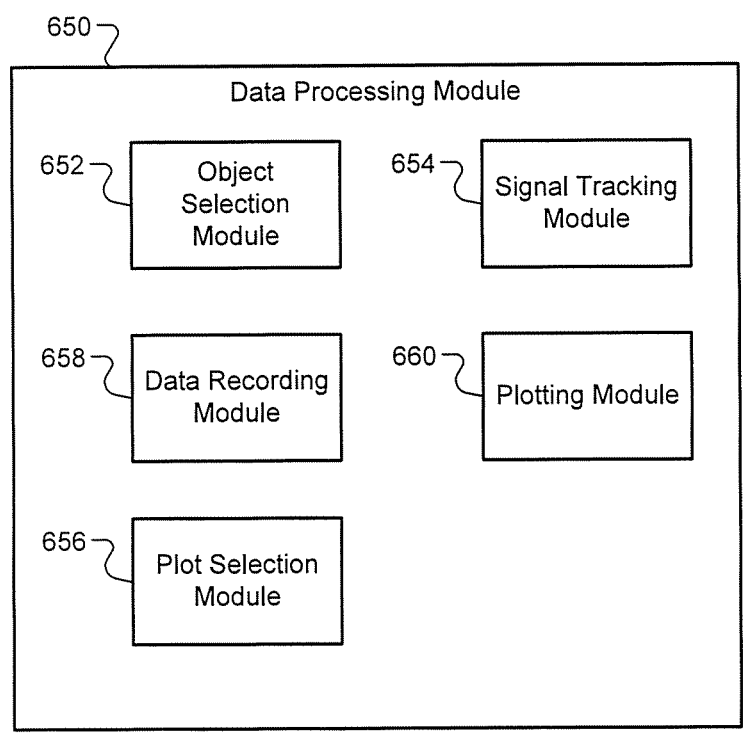
FIG. 17 is a functional block diagram of a data processing module in accordance with the present disclosure.

In FIG. 17, a functional block diagram of a data processing module 650 is shown. The data processing module 650 records and plots data for selected objects. The data processing module 650 includes an object selection module 652, a signal tracking module 654, a plot selection module 656, a data recording module 658 and a plotting module 660. The object selection module 652 stores a list in memory of N selected objects to monitor received user input signals. N is an integer greater than or equal to 2. The signal tracking module 654 may track states of the selected signals. The plot selection module 656 selects one or more of the N selected objects for plotting (M objects, where M is an integer less than or equal to N). The data recording module 658 records data for the N selected objects in memory. The plotting module 660 plots on, for example, a GUI signals associated with the M selected objects.

Figure 18:
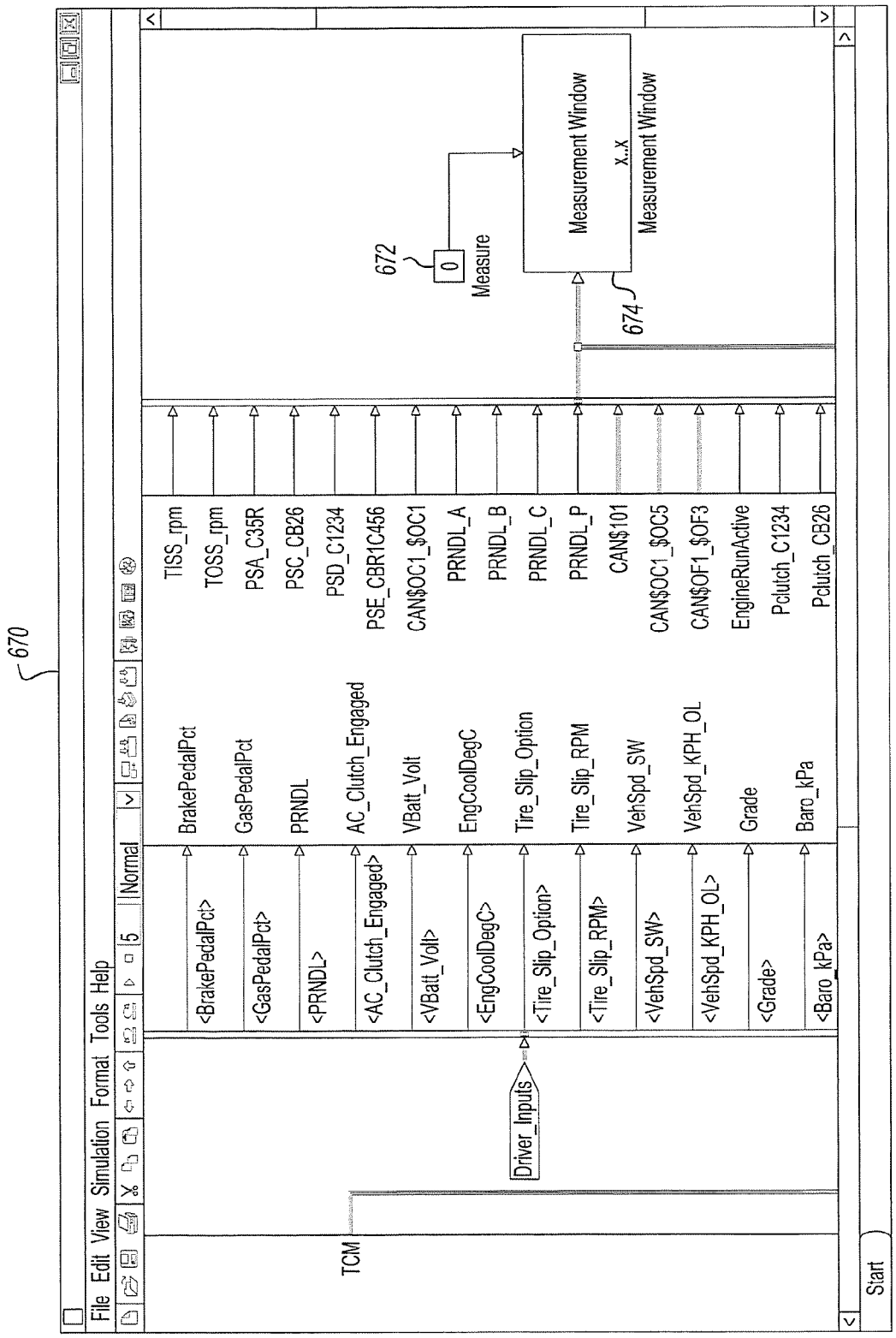
FIG. 18 is a view of a window illustrating an enable state of a measurement window in accordance with the present disclosure.

In FIG. 18, a view of a window 670 is shown illustrating enable state 672 of a measurement window 674. An enable state of 0 indicates that plotting is disabled. An enable state of 1 indicates that plotting is enabled.

Figure 19:
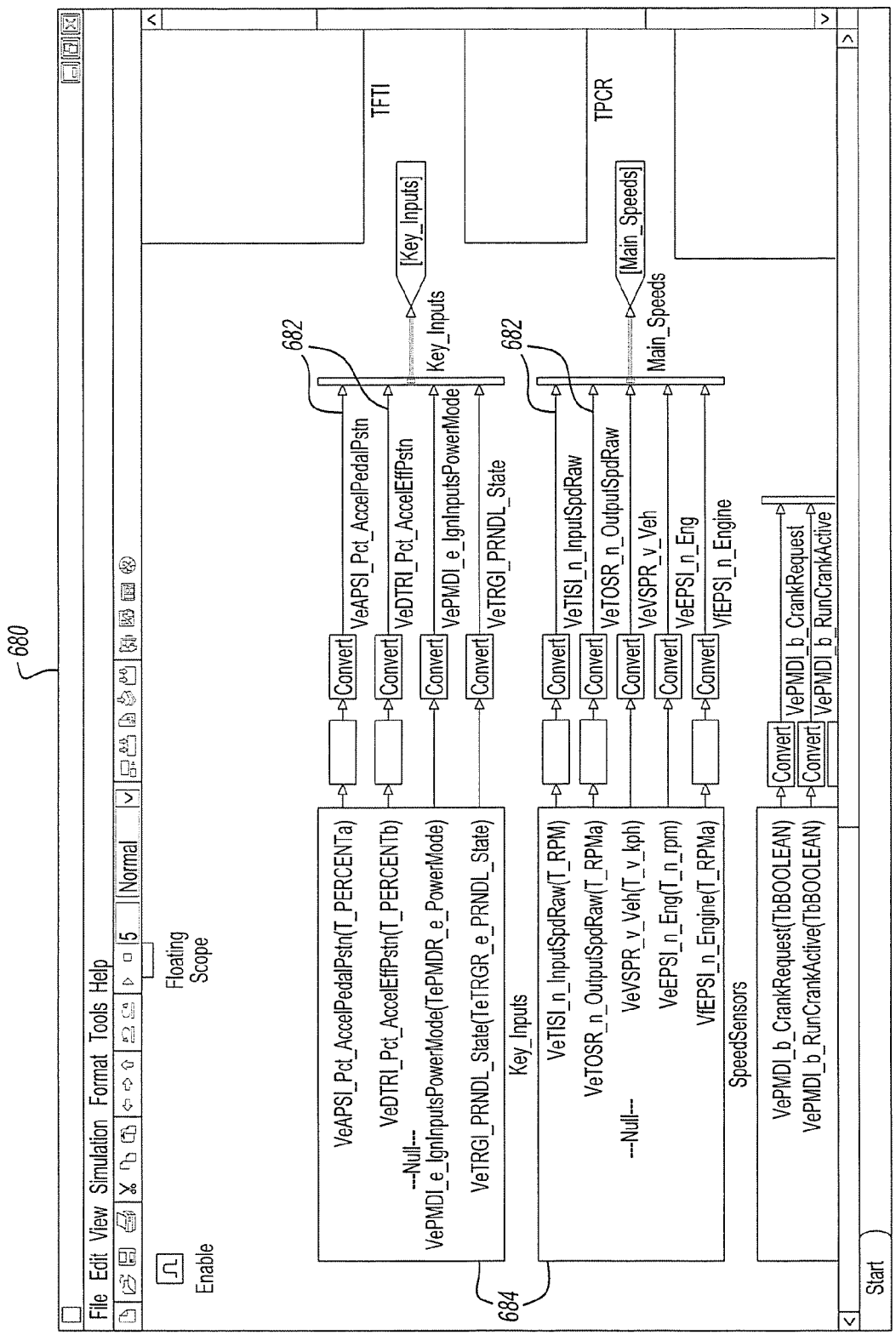
FIG. 19 is a view of a window with monitored objects in accordance with the present disclosure.

In FIG. 19, a view of a window 680 with monitored objects 682 is shown. The monitored objects 682 are shown as output signals of blocks 684. The monitored objects 682 may be, for example, the M of the N selected objects described with respect to FIG. 17.

Figure 20:
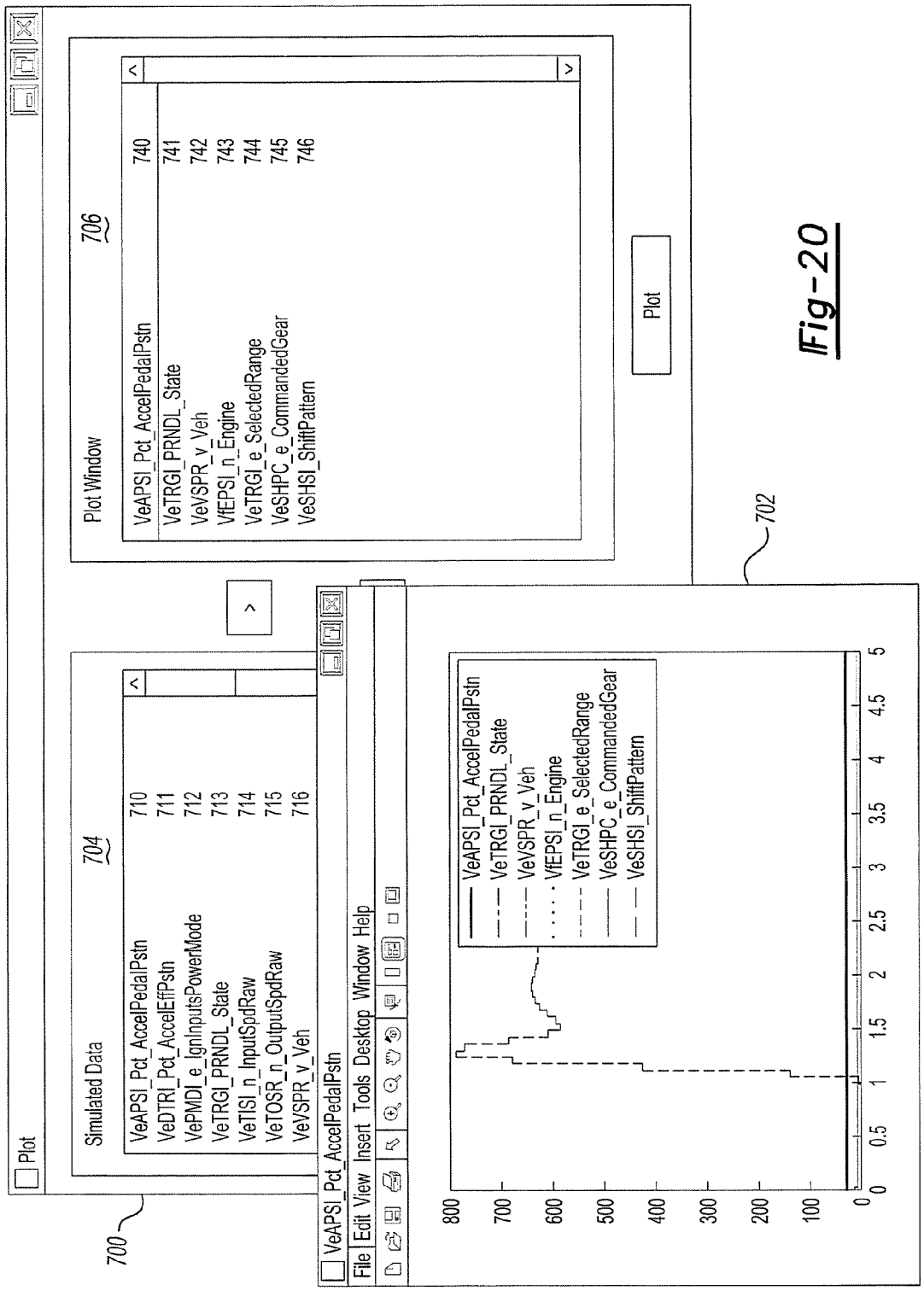
FIG. 20 is a view of multiple windows including an object selection window and a plotting window in accordance with the present disclosure.

In FIG. 20, a view of multiple windows including an object selection window 700 and a plotting window 702 is shown. The object selection window 700 illustrates selection of M of N objects. The object selection window 700 includes a simulated data list 704 and a plot list 706. The simulated data list 704 is a list of selected objects to monitor and record associated data. The plot list 706 is a selected list of the objects in the simulated data list 704 for which signal plotting is performed. The simulated data list includes a list of N objects 710-733. The plot list 706 includes a list of M objects 740-746.

Figure 21:
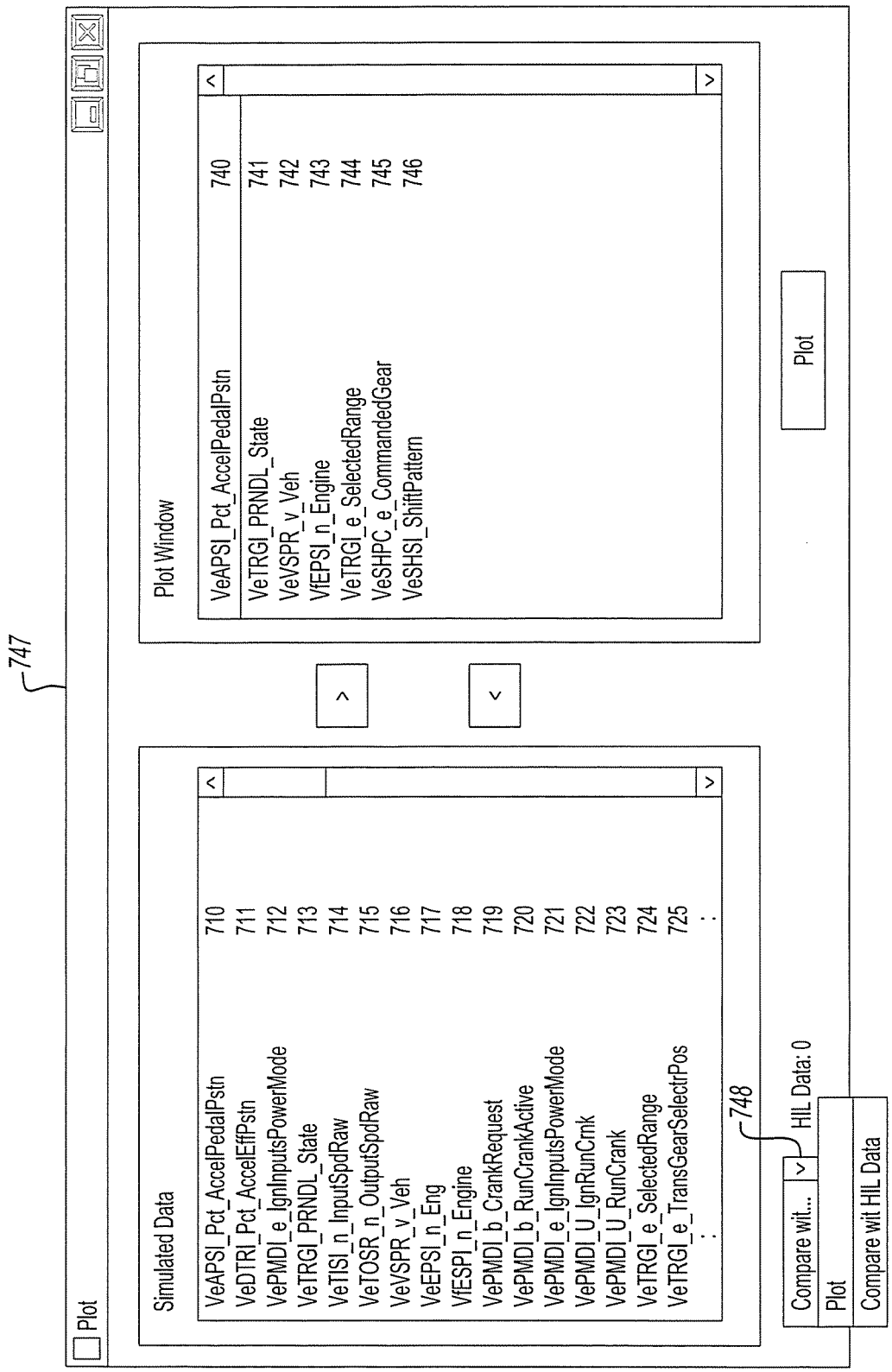
FIG. 21 is a view of another object selection window in accordance with the present disclosure.

In FIG. 21, a view of another object selection window 747 is shown. Simulation results generated using HIL testing may be compared with simulation results generated using SIL testing. The object selection window 747 includes a HIL comparison selection box 748. This allows for one or more comparisons to be performed for selected objects. The data processing module 92 of FIG. 3, for example, may perform this comparison based on received user input signals. The data processing module 92 may enable HIL comparisons based on the received user input signals. An example of a HIL comparison plot for vehicle speed is shown in FIG. 22.

Figure 22:
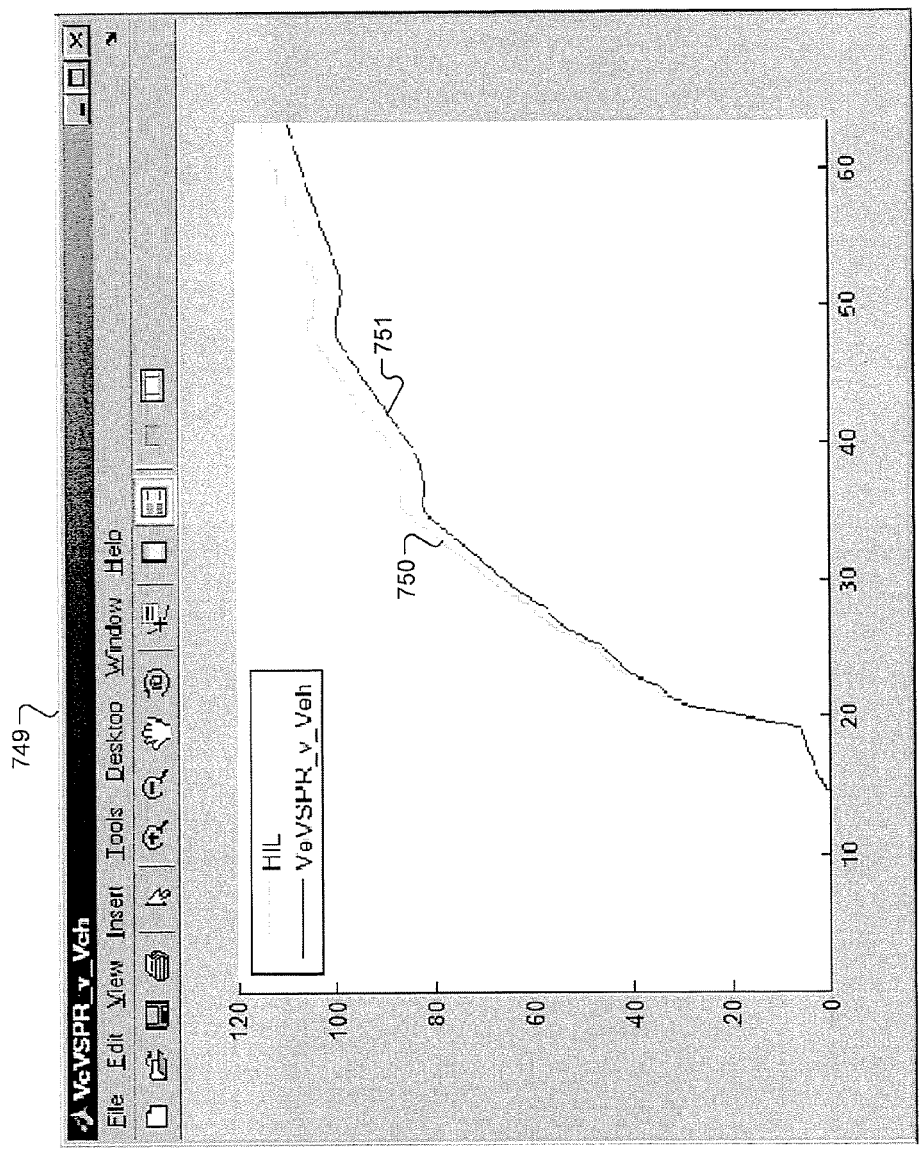
FIG. 22 is a view of a window with a hardware in-the-loop (HIL) plot and a SIL plot in accordance with the present disclosure.

In FIG. 22, a view of a window 749 with a hardware in-the-loop (HIL) plot 750 and a SIL plot 751 for a certain object is shown. The HIL plot and the SIL plot are for vehicle speed and provided respectively during HIL testing and SIL testing.

Figure 23:
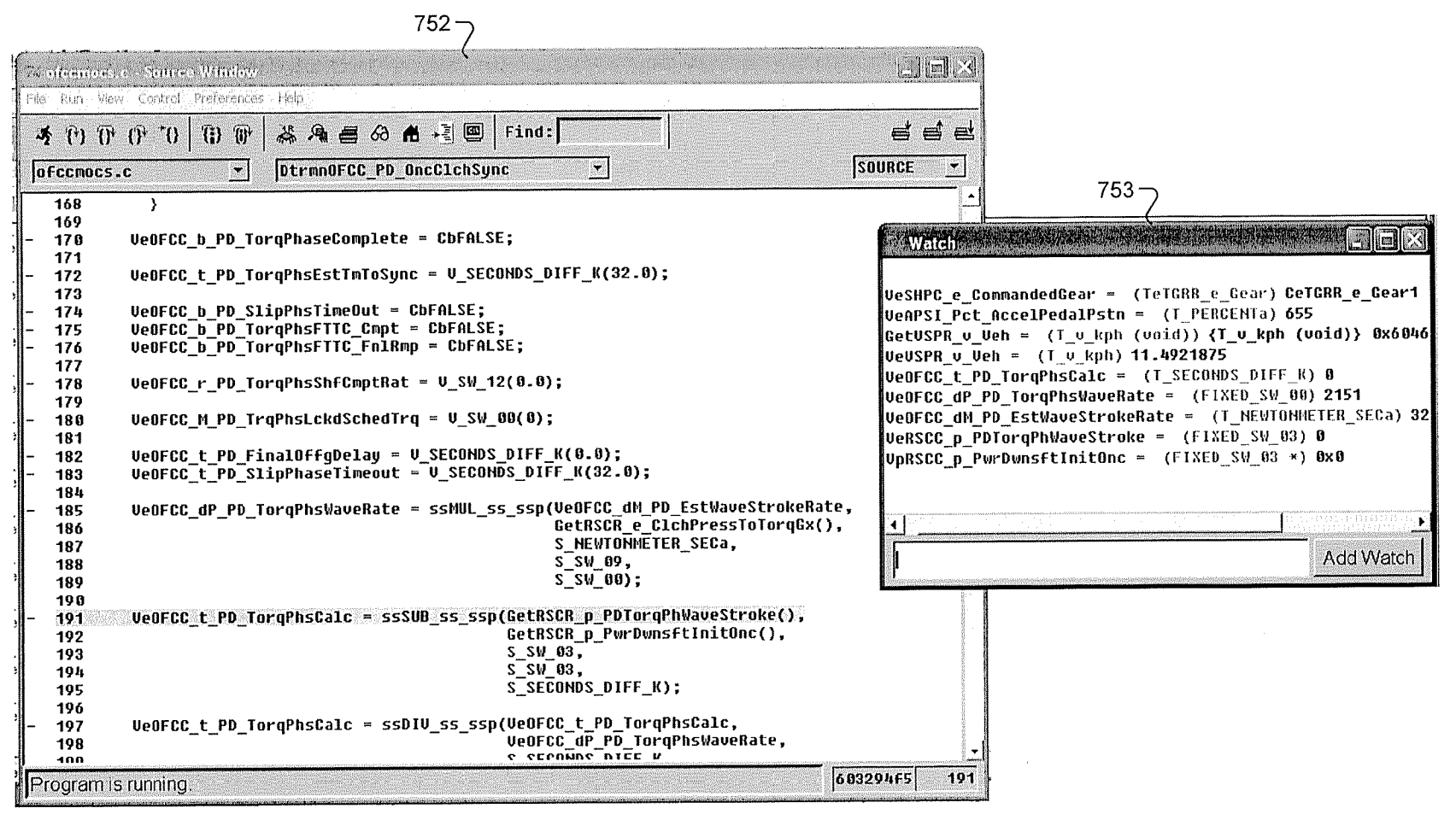

In FIG. 23, a view of multiple debugger windows is shown. The debugger windows include a code window 752 and a watch window 753. The code window shows line-by-line code execution and highlights or indicates a current line being executed. Lines of code identified as 168-191 are shown. The lines of code may be stepped through line-by-line or multiple lines of code may be executed at a time. Lines of code may also be executed until a break point is reached. This provides flexibility in debugging the code inside the transmission control block (SIL) 160. The watch window 753 includes a list of variables or parameters that are being monitored for errors.

Figure 24:
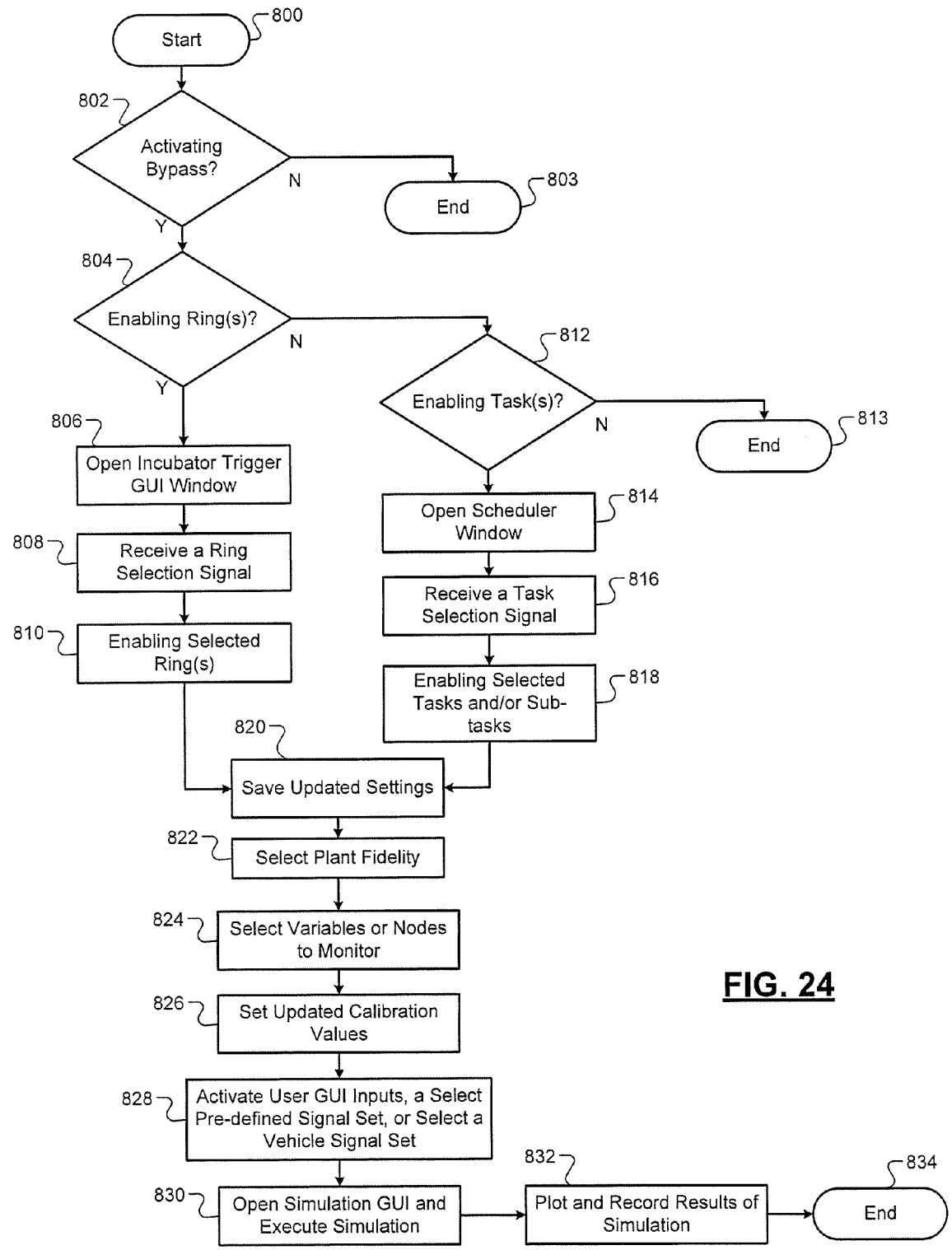
FIG. 24 illustrates a method of enabling tasks in accordance with the present disclosure.

Referring again to FIG. 3 and to FIG. 24, where a method of enabling tasks is shown. Although the method is described primarily with respect to the embodiment of FIG. 3, the method may be applied to other embodiments of the present disclosure. The method may begin at 800. Below described control may be performed by the modules of the host control module 74 of FIG. 3.

At 802, the scheduling module 82, the incubator triggering module 84 and/or the bypass switching module 98 may determine whether one or more block(s) are being bypassed. For example, when a first block is bypassed, a second block may be enabled and used as an alternative to the first block. Task 804 is performed when the first block is bypassed, otherwise control may end at 803.

At 804, the scheduling module 82 and/or the incubator triggering module 84 may determine whether one or more ring(s) are being enabled. Task 806 is performed when one or more ring(s) are enabled, otherwise task 812 is performed.

At 806, the incubator trigger module 84 opens the incubator trigger GUI, such as the window 590 of FIG. 15. At 808, the incubator trigger module 84 receives a ring selection signal. A function selection signal and/or a task selection signal may be received. At 810, the incubator trigger module 84 and/or the bypass switching module 98 enables selected rings, functions and/or tasks based on the received selection signals of 808. The selection signals may be generated based on a user input signal. This may occur, for example, when a user is changing state of a bypass switch.

At 812, the scheduling module 82 determines whether tasks are to be enabled. Task 814 is performed when tasks are enabled, otherwise control may end at 813. At 814, the scheduling module 82 opens a scheduling window, such as the scheduling window 500 of FIG. 14.

At 816, the scheduling module 82 receives a task selection signal. The task selection signal may be generated based on a received user input signal. At 818, the scheduling module 82 enables selected tasks and/or sub-tasks.

At 820, updates performed at 810 and 818 are saved. At 822, the plant model selecting module 90 may select a plant model fidelity level based on a received user input signal. At 824, the data processing module 92 may select objects to monitor. The data processing module 92 determines whether to store data and plot signals for the monitored objects. At 826, the calibration module 94 adjusts selected calibration modules.

At 828, the driving cycle module selects a driving cycle for a current simulation. The driving cycle module may select the driving cycle based on state of, for example, the switches 350-354 of FIG. 9. States of the switches 350-354 may be adjusted based on received user input signals. The driving cycle selected may be, for example, a user inputted driving cycle, a pre-defined driving cycle, or a vehicle stored driving cycle. The user inputted driving cycle may be provided via, for example, use of the GUI 450 of FIG. 13. The pre-defined driving cycle may include predefined signal plots, such as the signal plots of FIG. 10. The vehicle stored driving cycle includes recorded vehicle signals used as inputs to a vehicle system model during the simulation.

At 830, a GUI, such as the GUI 450 of FIG. 13, may be opened and the simulation is executed. At 832, results of the simulation are recorded and plotted. Task 830 and 832 may be performed during the same period. The method may end at 834.

The above-described tasks of FIG. 24 are meant to be illustrative examples; the tasks may be performed sequentially, synchronously, simultaneously, continuously, during overlapping time periods or in a different order depending upon the application.

For example, a VSS may begin with opening system simulation environment and model. Plant fidelity may then be selected as at task 822. This may be followed by activating user GUI inputs as at 828. Variables may then be selected as at 824. Calibration values may then be updated as at 826. This may be followed by tasks 802-820, which may then be followed by tasks 830-834.

Figure 25:
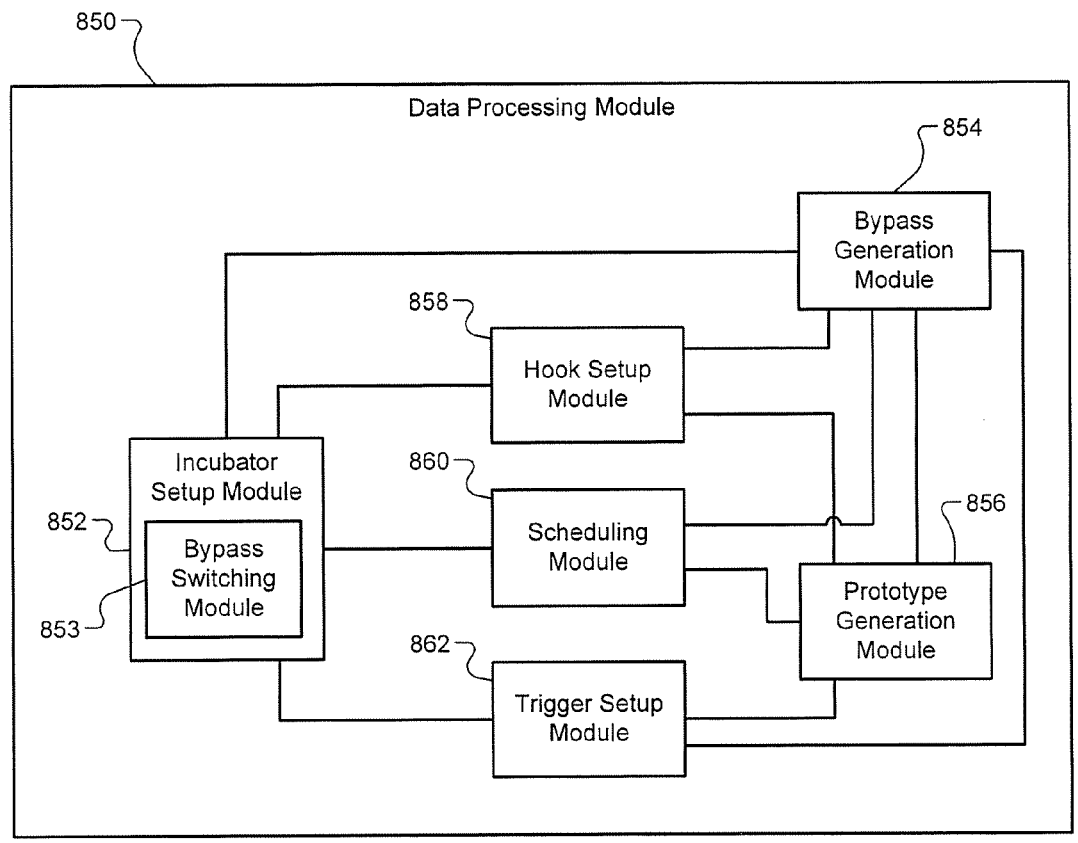
FIG. 25 is a functional block diagram of data processing module in accordance with the present disclosure.

In FIG. 25, a data processing module 850 is shown. The data processing module 850 includes an incubator (or bypass switch) setup module 852 with a bypass switching module 853, a bypass generation module 854, a prototype (new SIL block) generation module 856, a hook setup module 858, a scheduling module 860, and a trigger setup module 862. Two or more of the modules 852-862 may be combined into a single module.

Figure 26:
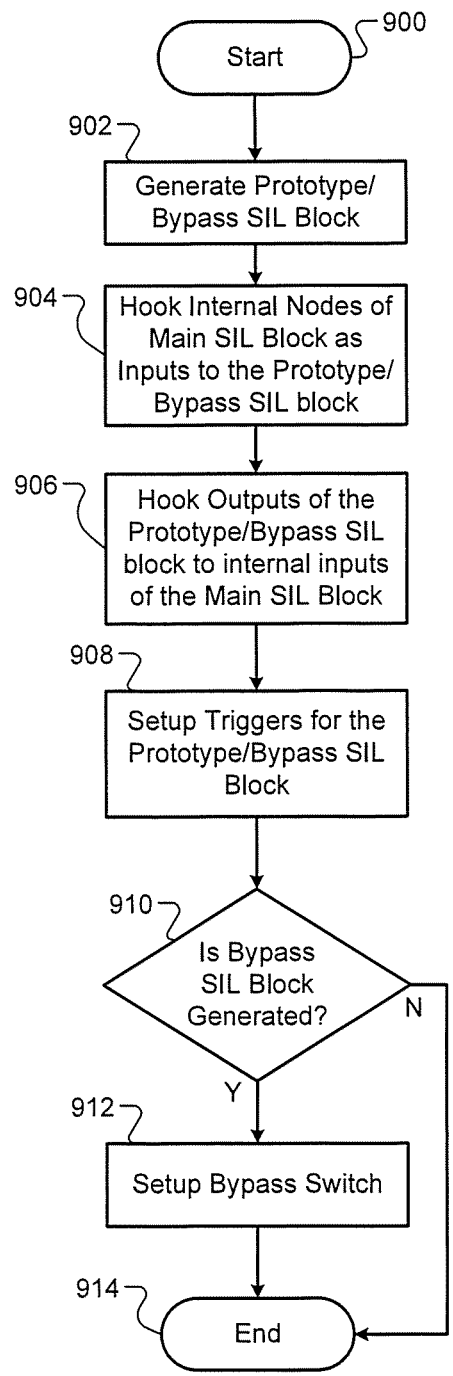
FIG. 26 illustrates a method of generating a block in accordance with the present disclosure.

Referring now also to FIG. 26, a method of generating a block is shown. Although the method is described primarily with respect to the embodiment of FIG. 25, the method may be applied to other embodiments of the present disclosure. The method may begin at 900. Below described control may be performed by the modules of FIG. 25.

At 902, the bypass generation module 854 generates a bypass block or the prototype generation module 854 or the prototype generation module 856 generates a prototype block. Generation of a bypass block or a prototype block may be based on user input signals via windows shown in, for example, FIGS. 4-6, 9, 11, 14 and 15. A new SIL block may be created and used as a bypass block or a prototype block.

At 904, the hook setup module 858 connects the inputs of the bypass block or the prototype block to other SIL blocks or objects in a current vehicle simulation model. The inputs may include states of variables or parameters stored in memory.

At 906, the hook setup module 858 connects the outputs of the bypass block or the prototype block to the other SIL blocks or objects in the current vehicle simulation model. The outputs may be used to change the states of variables or parameters stored in memory.

At 908, the scheduling module 860 and/or the trigger setup module 862 sets up triggers for the bypass block or the prototype block. The trigger setup may be performed as described with respect to FIGS. 14 and 15.

At 910, when a bypass block is generated task 912 is performed, otherwise control may end at 914. At 912, the incubator setup module 852 and/or the bypass switching module 853 may be used to enable or disable one or more bypass modules via respective switches. Example switches are shown in FIGS. 15 and 16. The method may end at 912.

The above-described tasks of FIG. 26 are meant to be illustrative examples; the tasks may be performed sequentially, synchronously, simultaneously, continuously, during overlapping time periods or in a different order depending upon the application.

The above-described embodiments allow control module algorithm models to be integrated into a vehicle simulation model such that a user can selectively execute auto generated code for a SIL block. The embodiments provide user selectable plant model fidelity levels. Driving cycles are selectable with GUI control. Algorithm model development is facilitated via generation of SIL blocks and/or corresponding bypass switches. The embodiments allow for transmission algorithm development, calibration, transmission hardware design, etc.

The embodiments allow for analysis and evaluation of transmission hardware, vehicle performance analysis (e.g., fuel economy study, shift quality, etc.). Study impacts on total system performance based on sensor and actuator errors maybe performed using the above-described system. Transmission algorithm development is provided using a virtual vehicle environment without use of vehicle hardware.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A vehicle simulation system comprising:
a first simulation model that when executed simulates a software ring of a vehicle module;
a second simulation model of the software ring; a bypass switch that has a first state and a second state;
a bypass switching module that switches the bypass switch between the first simulation model and the second simulation model based on a bypass signal and a ring enabling signal; and
a simulation control module that executes code of a vehicle simulation model including software in-the-loop (SIL) testing of a selected one of the first simulation model and the second simulation model based on state of the bypass switch; and
memory that stores a plurality of tasks,
wherein
the bypass switching module switches the bypass switch between the first model and the second model based on a task enabling signal; and
the task enabling identifies at least one of the plurality of tasks.

2. The vehicle simulation system of claim 1, further comprising a SIL block that includes the first simulation model, wherein:
inputs and outputs of the second simulation model are connected to internal nodes of the SIL block; and
the SIL block does not include the second simulation model.

3. The vehicle simulation system of claim 1, wherein the first simulation model includes a first set of tasks and the second simulation model comprises a second set of tasks.

4. The vehicle simulation system of claim 1, wherein:
the first simulation model is generated based on source code and a first set of autocode, the first set of autocode is generated based on a simulation sub-model; and
the second simulation model is not generated based on source code.

5. The vehicle simulation system of claim 1, further comprising a plant model selecting module that selects a plant model fidelity level,
wherein the simulation control module executes the vehicle simulation model based on a plant model corresponding to the plant model fidelity level.

6. The vehicle simulation system of claim 1, further comprising a plotting module that selects and plots variables, signals and nodes of the vehicle simulation model on a graphical user interface.

7. The vehicle simulation system of claim 1, further comprising a driving cycle module that selects a set of inputs including one of:
activating user inputs (i) received by SIL block of the vehicle simulation model and (ii) displayed on a graphical user interface;
selecting a pre-defined signal set; and
selecting a vehicle recorded signal set,
wherein the simulation control module executes the one of the first simulation model and the second simulation model based on the selected set of inputs.

8. The vehicle simulation system of claim 1, wherein the vehicle simulation model comprises:
a transmission SIL model that includes the first simulation model and receives input signals;
a first plant model of a transmission that operates based on outputs of the transmission SIL model; and
a second plant model of at least one of an engine and a vehicle system that operates based on outputs of the first plant model,
wherein the transmission SIL model operates based on outputs of the second plant model.

9. The vehicle simulation system of claim 8, wherein the vehicle simulation model further comprises:
at least one of a sensor model and a controller area network input model receives the outputs of the second plant model, wherein the transmission SIL model receives outputs of the at least one of the sensor model and the controller area network input model; and
at least one of a controller area network output model and an actuator model that receives the outputs of the transmission SIL model, wherein the first plant model receives outputs of the at least one of the controller area network output model and the actuator model.

10. A vehicle simulation system comprising:
a first simulation model that when executed simulates a software ring of a vehicle module;
a second simulation model of the software ring;
a bypass switch that has a first state and a second state;
a bypass switching module that switches the bypass switch between the first simulation model and the second simulation model based on a bypass signal and a ring enabling signal;
a simulation control module that executes code of a vehicle simulation model including software in-the-loop (SIL) testing of a selected one of the first simulation model and the second simulation model based on state of the bypass switch;
an incubator triggering module that enables tasks of the second simulation model based on state of the bypass switch; and
a scheduling module that individually selects and enables selected tasks of the second simulation model based on the ring enabling signal and a task selection signal.

11. The vehicle simulation system of claim 1, wherein:
the bypass switching module switches the bypass switch to a third state based on the ring enabling signal; and
the simulation control module executes the first simulation model and the second simulation model when the bypass switch is in the third state.

12. The vehicle simulation system of claim 1, further comprising a model generation module that generates models, wherein:
the vehicle simulation model has N software rings, where N is an integer greater than 2; and
the model generation module generates a prototype model of a prototype software ring, the prototype software ring is different than the N software rings and performs a different overall function than overall functions of each of the N software rings.

13. The vehicle simulation system of claim 12, further comprising:
a first SIL block that includes the first simulation model;
a SIL block generation module that generates a second SIL block, wherein the prototype model includes the second SIL block;
a hook setup module that connects inputs and outputs of the prototype model to nodes of the first SIL block; and
at least one of a trigger setup module and a scheduling module that establishes a trigger for a task of the second SIL block based on a trigger of the first SIL block.

14. The vehicle simulation system of claim 1, further comprising:
a first SIL block that includes the first simulation model;
a SIL block generation module that generates a second SIL block, wherein the second simulation model includes the second SIL block;
a hook setup module that connects inputs and outputs of the second simulation model to nodes of the first SIL block;
at least one of a trigger setup module and a scheduling module that establishes a trigger for a task of the second SIL block based on a trigger of the first SIL block; and
a bypass switch setup module that creates the bypass switch including an enable connection, a disable connection and a trigger connection for the second simulation model.

15. A vehicle simulation system comprising:
a plurality of simulation models including a first simulation model and a vehicle simulation model, each of the simulation models including respective inputs and outputs, wherein the first simulation model when executed simulates a software ring of a vehicle module, and wherein the vehicle simulation model comprises
a transmission SIL model that includes the first simulation model,
a first plant model of a transmission that operates based on outputs of the transmission SIL module,
a second plant model of at least one of an engine and a vehicle system that operates based on outputs of the first plant model,
at least one of a sensor model and a controller area network input model receives the outputs of the second plant model, wherein the transmission SIL model receives outputs of the at least one of the sensor model and the controller area network input model; and
at least one of a controller area network output model and an actuator model that receives the outputs of the transmission SIL model, wherein the first plant model receives outputs of the at least one of the controller area network output model and the actuator model;

a simulation control module that executes the vehicle simulation model;

an object selection module that selects N objects of the plurality of simulation models based on user input signals, wherein the N objects include variables, signals, and nodes and N is an integer greater than or equal to 2;

a signal tracking module that tracks states of the N objects during execution of code of the vehicle simulation model;

a data recording module that records the states of the N objects; and a plotting module that plots states of M of the N nodes on a graphical user interface, where M is an integer less than or equal to N.

16. The vehicle simulation system of claim 15, further comprising:

a software in-the-loop (SIL) block that includes at least one of the plurality of simulation models and when executed simulates a vehicle control module; and a plant model that when executed simulates at least one of the transmission and the engine of a vehicle, wherein the SIL block operates based on outputs of the plant model, wherein the plant model operates based on outputs of the SIL block, and wherein the object selection module selects objects of the SIL block and of the plant model.

17. The vehicle simulation system of claim 15, further comprising:

a second simulation model of the software ring;

a bypass switch that has a first state and a second state; and a bypass switching module that switches the bypass switch between the first simulation model and the second simulation model based on a bypass signal and a ring enabling signal, wherein the simulation control module when executing the code of the vehicle simulation model performs software in-the-loop (SIL) testing of a selected one of the first simulation model and the second simulation model based on state of the bypass switch, wherein the object selection module selects objects of the first simulation model and the second simulation model.

18. The vehicle simulation system of claim 17, wherein the transmission SIL model operates based on outputs of the second plant model; and the object selection module selects objects of the transmission SIL model, the first plant model and the second plant model.

19. The vehicle simulation system of claim 18, wherein the object selection module selects objects of (i) the at least one of the sensor model and the controller area network input model and of (ii) the at least one of the controller area network output model and the actuator model.

* * * * *